(12) United States Patent
Fournier

(10) Patent No.: US 10,723,400 B2
(45) Date of Patent: Jul. 28, 2020

(54) BICYCLE STORAGE UNIT

(71) Applicant: Louis Fournier, Saguenay (CA)

(72) Inventor: Louis Fournier, Saguenay (CA)

(*) Notice: Subject to any disclaimer, the term of this patent is extended or adjusted under 35 U.S.C. 154(b) by 0 days.

(21) Appl. No.: 16/174,239

(22) Filed: Oct. 29, 2018

(65) Prior Publication Data

US 2019/0135362 A1 May 9, 2019

Related U.S. Application Data

(63) Continuation-in-part of application No. 14/545,435, filed on May 4, 2015, now Pat. No. 10,112,667.

(30) Foreign Application Priority Data

May 5, 2014 (CA) ..................................... 2851093

(51) Int. Cl.
| | | |
|---|---|---|
| *B62H 5/00* | (2006.01) |
| *H02J 7/00* | (2006.01) |
| *E05B 65/02* | (2006.01) |
| *B62H 3/00* | (2006.01) |
| *E05B 73/00* | (2006.01) |
| *E05B 71/00* | (2006.01) |
| *B62H 3/04* | (2006.01) |
| *H02J 7/02* | (2016.01) |

(52) U.S. Cl.
CPC ............... *B62H 5/003* (2013.01); *B62H 3/00* (2013.01); *B62H 3/04* (2013.01); *E05B 65/025* (2013.01); *E05B 71/00* (2013.01); *E05B 73/0005* (2013.01); *H02J 7/0045* (2013.01); *H02J 7/0044* (2013.01); *H02J 7/027* (2013.01)

(58) Field of Classification Search
CPC .. E05B 73/0011; E05B 73/0005; E05B 71/00; E05B 65/025; E05B 65/00; H02J 7/0045; H02J 7/0044; H02J 7/027; H02J 2310/40; A47F 10/04; B60L 53/30; B62H 5/003; B62H 2003/005; B62H 3/00; B62H 5/00; B62H 3/04; B62H 5/005; B62H 3/12; B62H 3/08
USPC ...... 70/58–63, 159–162, 225–227, 233–236; 224/924; 211/5, 17, 20, 22
See application file for complete search history.

(56) References Cited

U.S. PATENT DOCUMENTS

| | | |
|---|---|---|
| 1,008,271 A | 11/1911 | Jay |
| 2,180,117 A | 11/1939 | Lipsis |
| 3,781,861 A | 12/1973 | Adler et al. |
| 3,827,773 A | 8/1974 | Aiello |
| 3,934,436 A | 1/1976 | Candlin et al. |
| 3,989,327 A | 11/1976 | Candelaria |
| 4,012,930 A | 3/1977 | Benson |
| 4,069,919 A | 1/1978 | Fernbaugh |
| 4,079,872 A | 3/1978 | Halter |
| 4,474,116 A | 10/1984 | Castenada, Jr. |
| 4,681,380 A | 7/1987 | Carlin |

(Continued)

FOREIGN PATENT DOCUMENTS

| | | |
|---|---|---|
| DE | 102012110913 | 5/2014 |
| EP | 0034554 | 8/1981 |
| FR | 2529606 | 1/1984 |

*Primary Examiner* — Lloyd A Gall
(74) *Attorney, Agent, or Firm* — William H. Bollman

(57) ABSTRACT

A bicycle stand including a frame, a flexible cable or chain for securing a bicycle to the frame, and a lockable container which is attached to the frame, the flexible cable or chain having at least one end secured within the container.

6 Claims, 33 Drawing Sheets

(56) References Cited

U.S. PATENT DOCUMENTS

| | | | |
|---|---|---|---|
| 4,807,453 A | 2/1989 | Bernier et al. | |
| 4,811,577 A | 3/1989 | Webster | |
| 4,813,253 A | 3/1989 | Dumas | |
| 4,920,334 A | 4/1990 | DeVolpi | |
| 5,325,686 A | 7/1994 | Bentley | |
| 5,531,083 A | 7/1996 | Franck et al. | |
| 5,595,073 A | 1/1997 | Sullivan | |
| 5,743,418 A | 4/1998 | Ahrens | |
| 5,889,463 A | 3/1999 | Judd et al. | |
| 5,917,407 A | 6/1999 | Squire et al. | |
| 6,763,689 B1 | 7/2004 | Thomas | |
| 7,431,555 B2 | 10/2008 | Liberman | |
| 7,571,628 B2 | 8/2009 | D'Anieri | |
| 8,065,895 B2 | 11/2011 | Andersen | |
| 8,439,210 B1 | 5/2013 | Griffith | |
| 8,500,074 B1 | 8/2013 | Cochran | |
| 8,636,153 B1 | 1/2014 | Dattilo | |
| 8,770,453 B2 | 7/2014 | Lang | |
| 10,112,667 B2 * | 10/2018 | Fournier | E05B 65/00 |
| 2002/0095960 A1 * | 7/2002 | Grover | E04H 6/005 |
| | | | 70/233 |
| 2006/0266721 A1 | 11/2006 | Gregory | |
| 2009/0031766 A1 | 2/2009 | Stobbe | |
| 2009/0201127 A1 | 8/2009 | Stobbe et al. | |
| 2013/0228535 A1 | 9/2013 | Wood et al. | |

\* cited by examiner

BICYCLE STORAGE UNIT

The present application is a continuation-in-part of U.S. application Ser. No. 14/545,435, entitled "Bicycle Storage Device", filed May 4, 2015, now U.S. Pat. No. 10,112,667, the entirety of which is expressly incorporated herein by reference.

BACKGROUND OF THE INVENTION

1. Field of the Invention

The present invention relates to bicycles and more particularly, relates to temporary bicycle storage and parking for cyclists.

2. Background of Related Art

Bicycling has increased in popularity over the last several years and the use of a bicycle as a mode of transportation is increasing. Also increasingly popular is the use of the bicycle for recreational purposes.

The problem of bicycle storage is one which has existed for many years. Since bicycles are readily portable, bicycle theft has always been a problem and particularly with some of the more expensive bicycles which are increasingly common. In order to overcome this, the typical cyclist will carry a cable and a lock which will assist in securing the bicycle to an immovable object. The immovable object is typically a post of one sort or another such as a parking meter post. However, any suitable device around which a cable can be entwined can be used.

The locating of a suitable immovable object can sometimes be problematic. Accordingly, the provision of public bicycle racks is evolving. These bicycle racks can be used wherever cyclists will tend to temporarily leave their bicycle such as near restaurants, convenience stores, shopping malls, schools of various types, parks, near public transportation, etc.

One further problem which arises is that the cyclist usually has personal equipment which is ideally stored rather than carried by the cyclist. The personal equipment can include such things like a helmet, backpack, books, etc.

SUMMARY OF THE INVENTION

In accordance with a first aspect of the present invention, a bicycle stand comprises a frame defining a plurality of bike receiving recesses. A plurality of lockable containers each have an access door and are each sized to receive at least a bicycle helmet. There is an externally lockable latch on the access door of each of the plurality of lockable containers. The lockable latch secures the access door in a closed secured state to create a secured interior of a respective one of the plurality of lockable containers. At least one battery charger unit is mounted adjacent or within at least one of the plurality of lockable containers. A charge plug of a battery charger unit is mounted within the interior of each of the plurality of lockable containers. There are a plurality of flexible cables each associated respectively with one of the plurality of lockable containers. Both ends of each of the flexible cables breach into the secured interior of the lockable container through a bottom wall with the access door in the closed secured state while a central portion of the flexible cable is external to the respective one of the plurality of lockable containers. Both ends of the flexible cable are held entirely within the secured interior of the respective one of the plurality of lockable containers with the access door in the closed secured state. A first passageway in the bottom wall is formed against the access door so as to permit passage of a charger cable when plugged between the charge plug inside the secured interior of the respective one of the plurality of lockable containers, and an electric bike parked in the bicycle stand.

In accordance with a second aspect of the present invention, there is provided a bicycle stand, comprising a frame defining a plurality of bike receiving recesses. A plurality of lockable containers each have an access door and are sized to receive at least a rechargeable battery of an electric bicycle (e-bike). There is an externally lockable latch on the access door of each of the plurality of lockable containers. The lockable latch secures the access door in a closed secured state to create a secured interior of a respective one of the plurality of lockable containers. There is at least one battery charger unit mounted adjacent or within each of the plurality of lockable containers. A charge plug of a battery charger unit is mounted within the interior of each of the plurality of lockable containers. There are a plurality of flexible cables each associated respectively with one of the plurality of lockable containers. Both ends of each of the flexible cables breaches into the secured interior of the lockable container through a bottom wall with the access door in the closed secured state while a central portion of the flexible cable is external to the respective one of the plurality of lockable containers. Both ends of the flexible cable are held entirely within the secured interior of the respective one of the plurality of lockable containers with the access door in the closed secured state.

BRIEF DESCRIPTION OF THE DRAWINGS

Features and advantages of the present invention will become apparent to those skilled in the art from the following description with reference to the drawings, in which:

FIG. 27 is an external view of a bicycle storage device showing the possibility to install a complete recharging system as add-on.

DETAILED DESCRIPTION

In given embodiments the present invention provides a bicycle stand comprising a frame, a flexible cable for securing a bicycle to the frame, and a lockable container, the lockable container being attached to the frame, the flexible cable having at least one end thereof secured within the container.

According to some embodiments of the present invention, there is also provided a stand or support to which a bicycle may be secured and which will include a closed cabinet or container into which the cyclist's personal belongings may be placed. The container will be associated with a locking arrangement which will secure both the bicycle and the belongings of the cyclist.

The stand or support to receive the bicycle may come in many different forms and sizes. Thus, it could range from a single unit to units capable of receiving two or four bicycles or even further, they may be formed to receive a multiplicity of bicycles, either in a row or in a circular pattern. It suffices to say that any number of storage spaces may be provided with the storage spaces being of a size to accommodate all bicycle types—i.e. from children to adults, commuter bicycles, competitor's bicycles, etc.

As above mentioned, the storage unit will include a container into which the cyclist's belongings may be placed. There will also be provided a cable or chain which will extend exteriorly thereof and which may be wrapped around the various components of the bicycle as is presently known in the art.

The cable will be flexible and of a material/size sufficient to withstand normal cutting tools used by bicycle thieves. Preferably both ends of the cable will lock interiorly of the storage cabinet so that access will be denied thereto.

The cabinet or container will be locked. This can either be accomplished utilizing the lock of the user (well known in the art) or any other equivalent arrangement. Thus, there may be the capability for the user to rent a lock on site or alternatively, a locking mechanism may be utilized using a person's credit card or other identifying element such as numerical ID, etc. Thus, if used by a company for its employees, the identifying element or card may be issued by the company to its employees. The identifying element would be personal to the one person.

Naturally, the storage unit can include accessory equipment such as an alarm system. The units are preferably sufficiently rugged and weather resistant.

Each unit would be of a size/weight sufficient to prevent theft of the unit per se.

Figure 1:
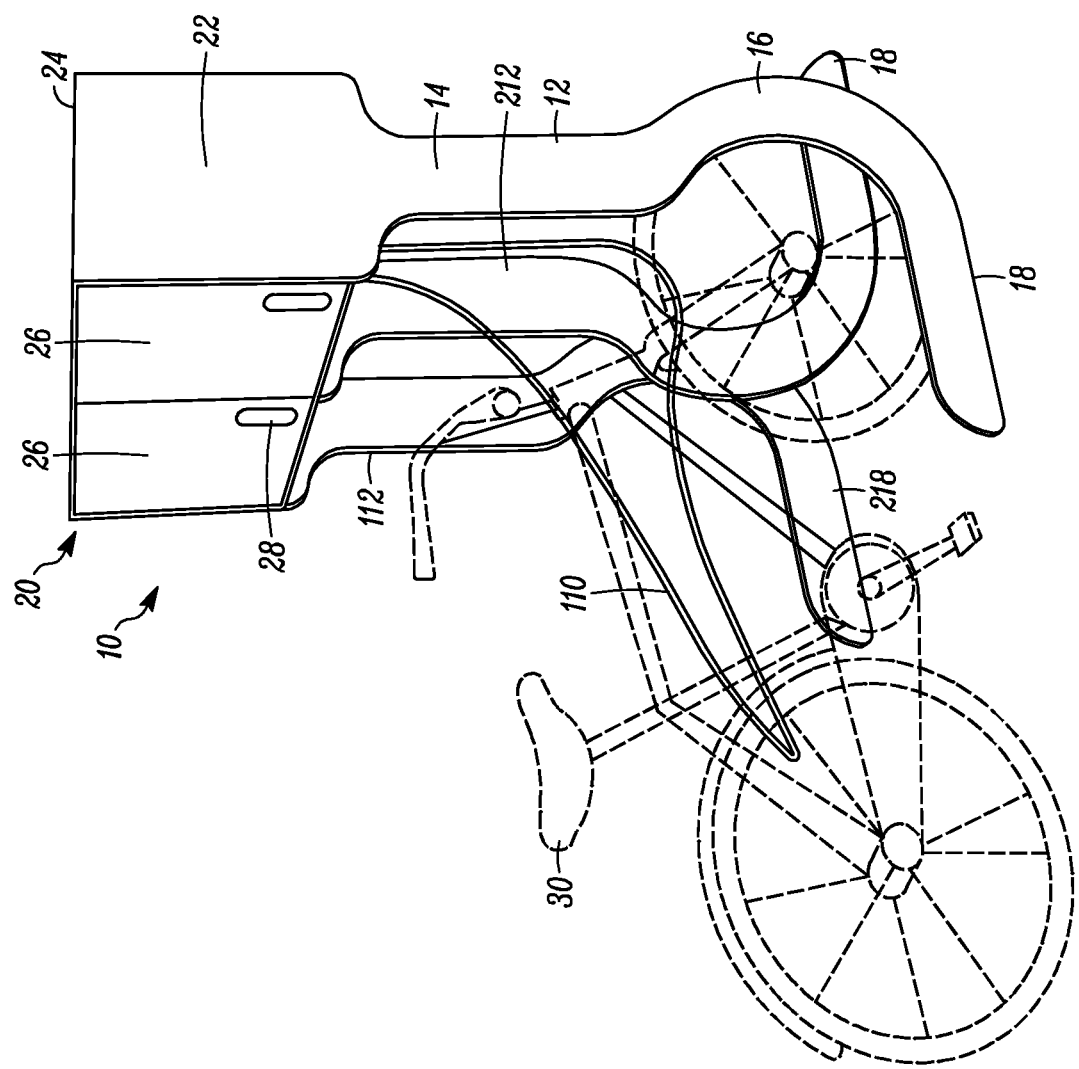
FIG. 1 is a perspective view of a first arrangement of a bicycle stand.

Referring to the drawings in greater detail and by reference characters thereto, there is illustrated in FIG. 1 a bicycle storage device generally designated by reference numeral 10 and which may be used to securely store one or more bicycles.

Bicycle storage device 10 includes a plurality of frame members 12, 112, 212 which are each similar and thus only one will be described herein.

Frame member 12 includes a vertical upper portion 14 and a horizontal lower portion 18. Horizontal lower portion 18 and vertical upper portion 14 are connected by an arcuate shaped middle portion or segment 16.

The bicycle storage device 10 includes a storage compartment which is generally designated by reference numeral 20. Storage compartment 20 is defined by a plurality of walls as is conventional in the art; shown herein are side wall 22 and top wall 24. A door 26 provides access to the interior of storage compartment 20 and a handle 28 may be provided. The storage compartment 20 will also include a locking arrangement which is not illustrated in this embodiment. It suffices to say that any number of known locking devices and/or locks may be utilized in the practice of the invention.

Bicycle storage device 10 is designed to receive one or more bicycles with a single one 30 being illustrated in dotted lines herein. A locking flexible cable 110 is utilized to lock about one or more portions of bicycle 30 and is locked interiorly of storage compartment 20 as will be illustrated hereinbelow.

Figure 2:
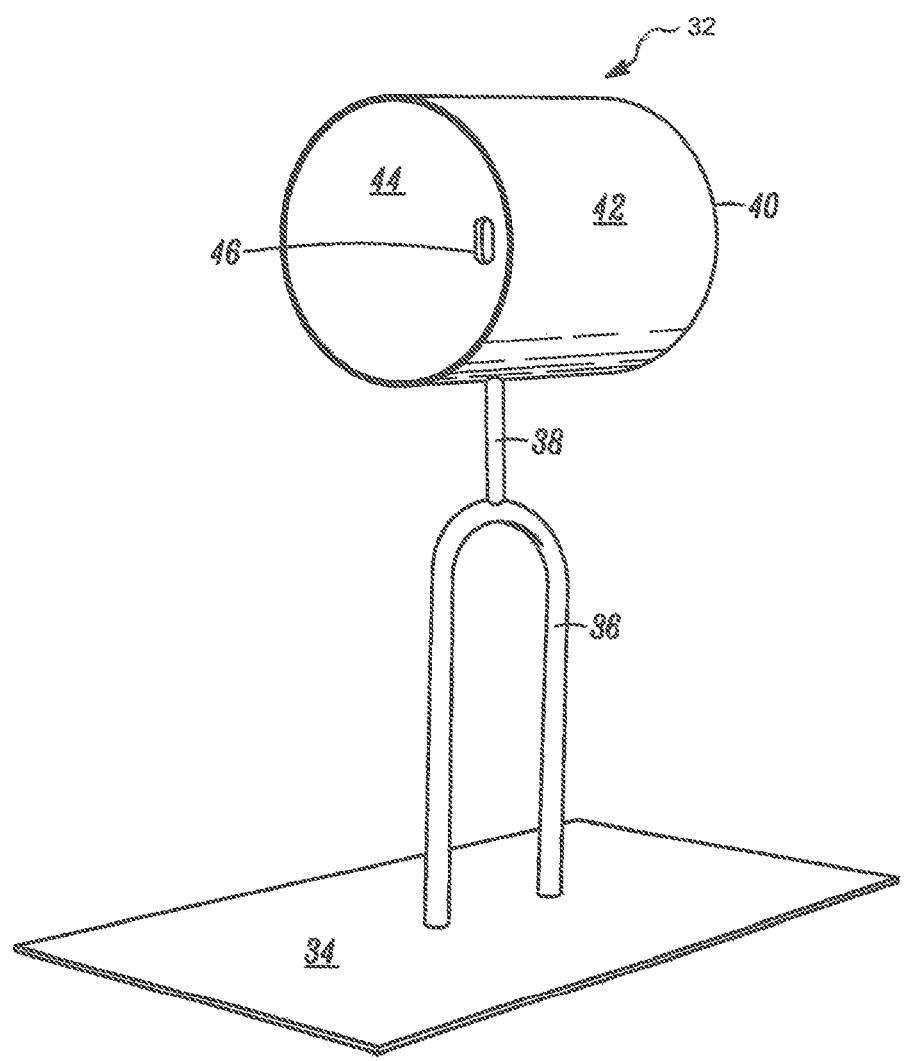
FIG. 2 is a perspective view of another embodiment thereof.

A further embodiment of the invention is illustrated in FIG. 2. A bicycle storage device is generally designated by reference numeral 32. Bicycle storage device 32 includes a platform or base 34. Sitting on base 34 is an inverted U-shaped frame generally designated by reference numeral 36. Connected to an extending upwardly from inverted U-shaped frame 36 is a vertical post 38. Vertical post 38 is used to mount a storage compartment generally designated by reference numeral 40 and which includes a cylindrical side wall 42. A door 44 with a handle 46 is provided at one end thereof. As was the case in the previous embodiment, a suitable locking arrangement is provided between the door 44 and the cylindrical side wall 42.

Figure 3:
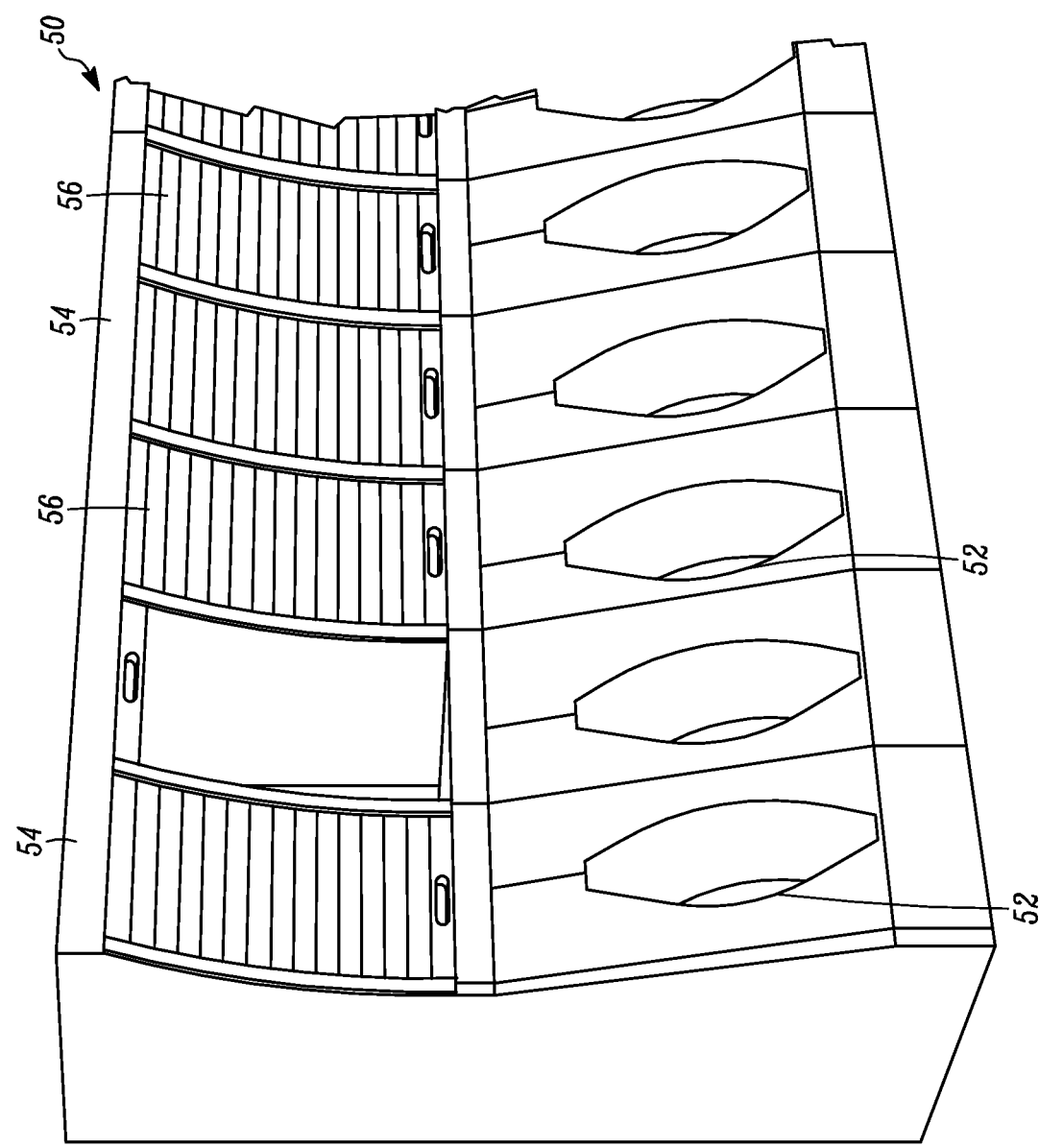
FIG. 3 is a perspective view of a still further embodiment thereof.

In the embodiment of FIG. 3, there is provided a bicycle storage device generally designated by reference numeral 50. Bicycle storage device 50 includes a number of individual storage slots 52 defined within a frame and housing. Each individual storage slot 52 has a storage compartment 54 associated therewith. Each storage compartment 54 includes a sliding door 56 along with a suitable locking arrangement.

Figure 5:
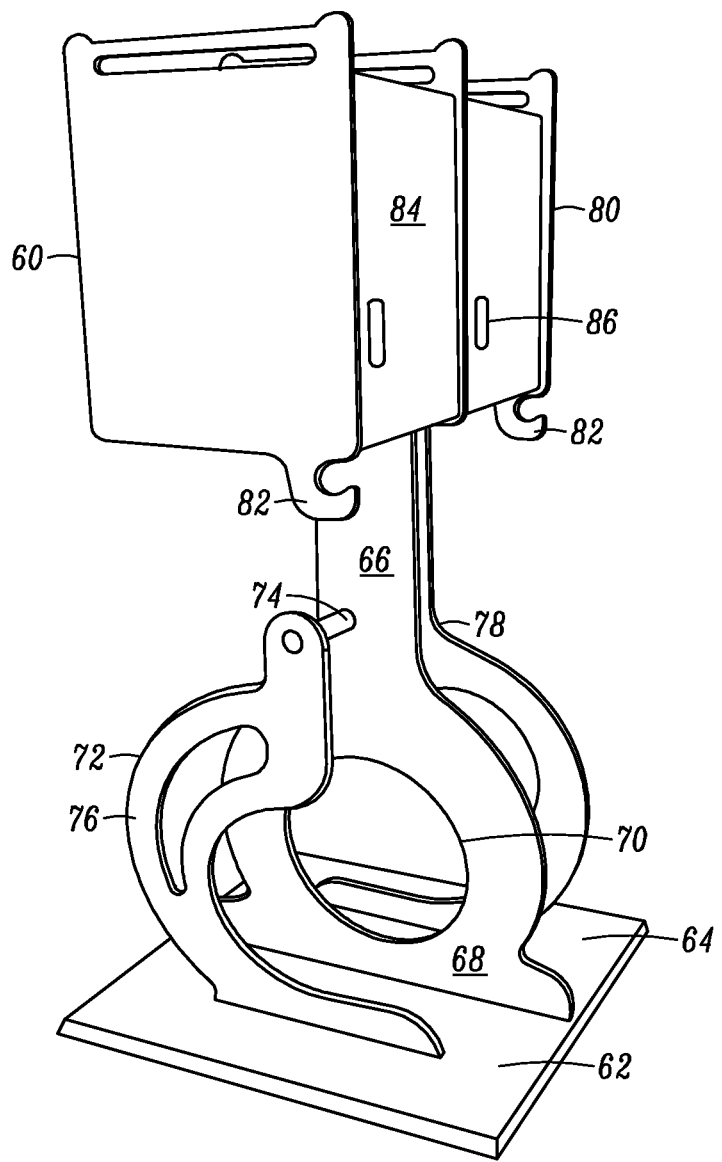
FIG. 5 is a perspective view of a further embodiment.
Figure 6C:
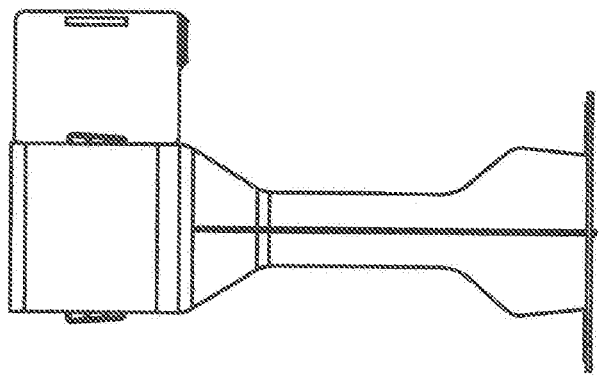
FIGS. 6A to 6D are a side view, front view, opposite side view, and top view, respectively, of an embodiment of a bicycle storage unit in accordance with the present invention.
Figure 6B:
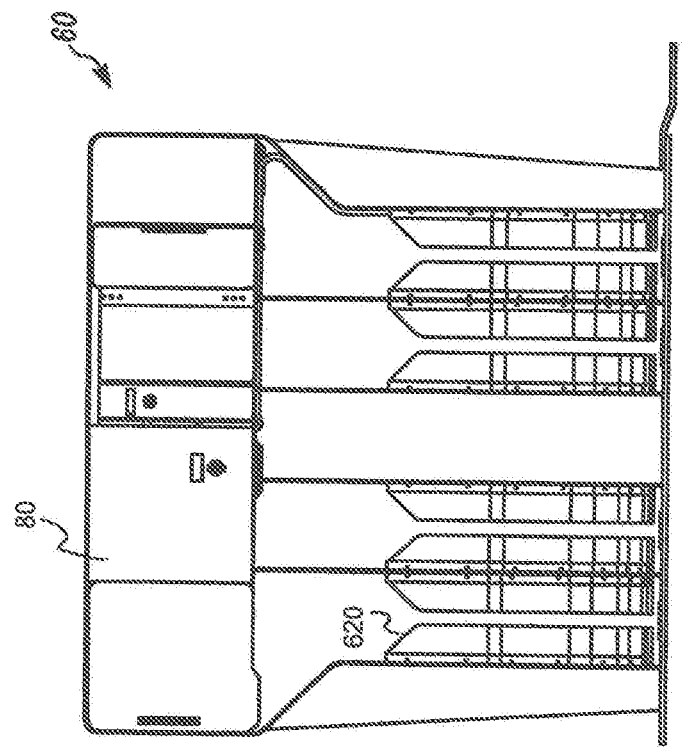
Figure 6D:
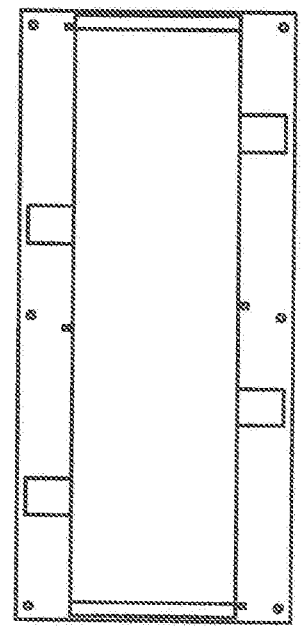
Figure 6A:
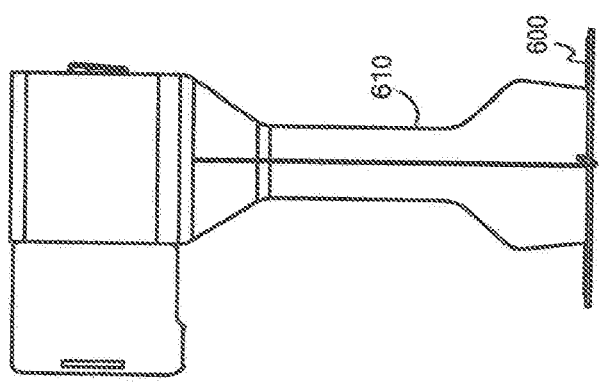
Figure 7C:
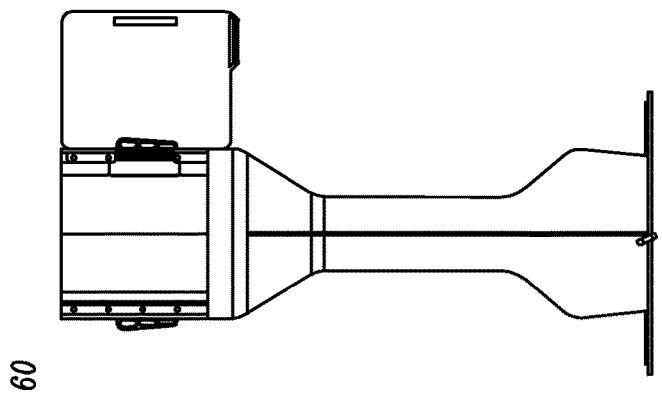
FIGS. 7A to 7D are a side view, front view, opposite side view, and top view, respectively, of the embodiment of a bicycle storage unit shown in FIGS. 6A to 6D, taken at line 7D-7D.
Figure 7B:
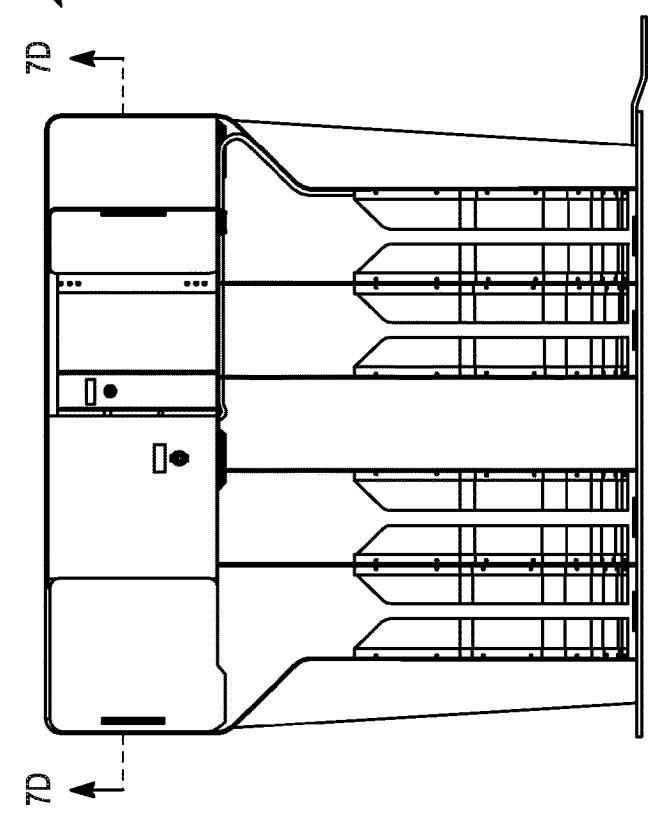
Figure 7D:
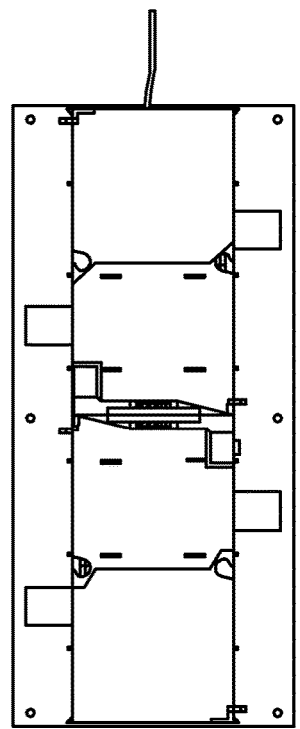
Figure 7A:
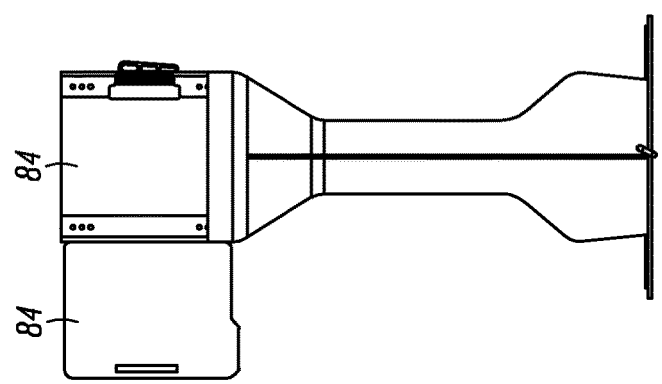

A further bicycle storage device is illustrated in FIG. 5 and reference will now be had thereto. The bicycle storage device is generally designated by reference numeral 60. Bicycle storage device 60 includes a platform or base 62 which is designed to sit on a substrate surface. In this embodiment, bicycle storage device 60 includes a center frame member generally designated by reference numeral 64. Center frame member 64 has an upper portion 66 and a lower portion 68. As may be seen, lower portion 68 includes a circular cut-out 70 to permit the passing of a cable therethrough.

A first side frame member generally designated by reference numeral 72 has an attachment rod 74 which is connected to center frame member 64. The first side frame member 72 also has a cutout 76.

A second side frame member 78 is provided on the other side of the center frame member 64 and is substantially identical to the first side frame member 72 save and except that it is reversed in position. Storage compartments 80 are provided and are mounted to the upper portion 66 of the center frame member 64. It will be noted that extending downwardly from the storage compartments 80 are hooks 82 which may be utilized to receive accessories. Doors 84 have handles 86 associated therewith. As is the case in the previously described embodiments, a suitable locking arrangement is provided for the doors 84.

Figure 4:
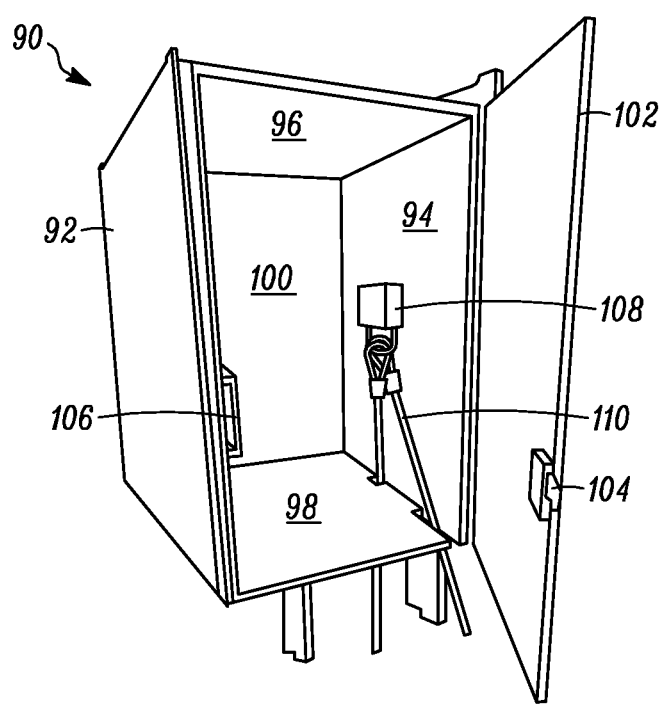
FIG. 4 is a view illustrating the locking of the device within a storage cabinet.

A typical storage compartment is illustrated in FIG. 4 and is designated by reference numeral 90. Storage compartment 90 includes first and second side walls 92, 94, a top wall 96, a bottom wall 98, and a back wall 100. A door 102 is provided to gain access to the storage compartment 90. The door 102 has a locking mechanism 104 thereon which will engage with a mating locking mechanism 106 on side wall 92.

An interior lock 108 is provided to which a flexible cable 110 may be connected. The flexible cable 110 may extend outwardly through openings between the side wall 94 and the bottom wall 98.

FIGS. 6A to 6D are a side view, front view, opposite side view, and top view, respectively, of an embodiment of a bicycle storage unit in accordance with the present invention.

Describing the bicycle storage device 60 of the embodiment of FIGS. 6A to 6D, from the bottom up, there is a solid baseplate 600, a plurality of vertically oriented supporting structures 610, non-metallic strips of flexible material 620, and an array of secured storage compartments 80.

The solid baseplate 600 on which rest the entire structure and all other components, thus solid base plate making installation easy by means of drilled holes or other anchoring means. It is also anti-corrosion. Can be painted or anodized.

The plurality of vertically oriented supporting structures 610 made out from any material, in any shape like sheet, plate, tube or else. This structure is fixed to the solid baseplate and the lockers-array's lower portion or bottom plate of lockers. It is also anti-corrosion. Can be painted or anodized.

The non-metallic strips of flexible material 620 (rubber like) are installed in mirror-pairs and on accessible from both side of the bicycle storage device 60, fixed into the spaces between and in contact with the vertically oriented supporting structures 610. The purpose of these strips of flexible material 620 in which front or rear bicycle wheel is inserted (for storage) is to protect the bike components (wheels, rims, frame, etc.) from scratches and dents, and the keep the bike straight up on its wheels in equilibrium. The non-metallic strips of flexible material 620 can be installed on the bicycle storage device 60.

The array of secured storage compartments 80, two on each side installed side to side in the given embodiment, are positioned in mirror from mid frontal plane. There can be more storage compartments 80 per side according to an overall size of the bicycle storage device 60. The array of secured storage compartments 80 is also preferably anti-corrosion. It can be painted or anodized.

There can be identification signs, commercial advertisement signs, art work, etc. on the bicycle storage device 60. Any suitable material can be used to make this kind of outdoor commercial signings. There can be lit signs.

FIGS. 7A to 7D are a side view, front view, opposite side view, and top view, respectively, of the embodiment of a bicycle storage unit 60 shown in FIGS. 6A to 6D, taken at line 7D-7D.

Figure 8B:
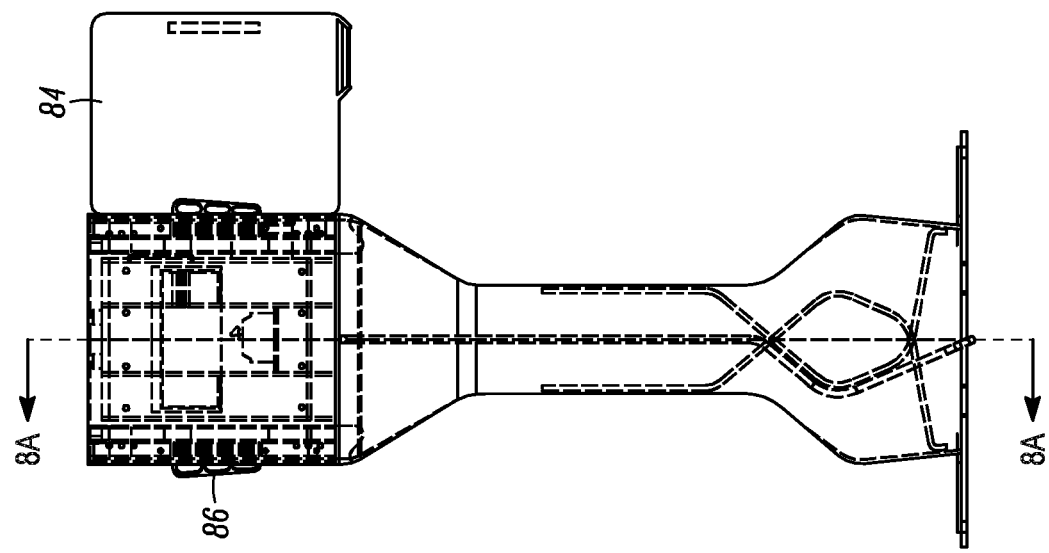
FIGS. 8A and 8B are a front view and opposite side view of the embodiment of the bicycle storage unit shown in FIGS. 6A to 6D, taken at line 8B-8B.
Figure 8A:
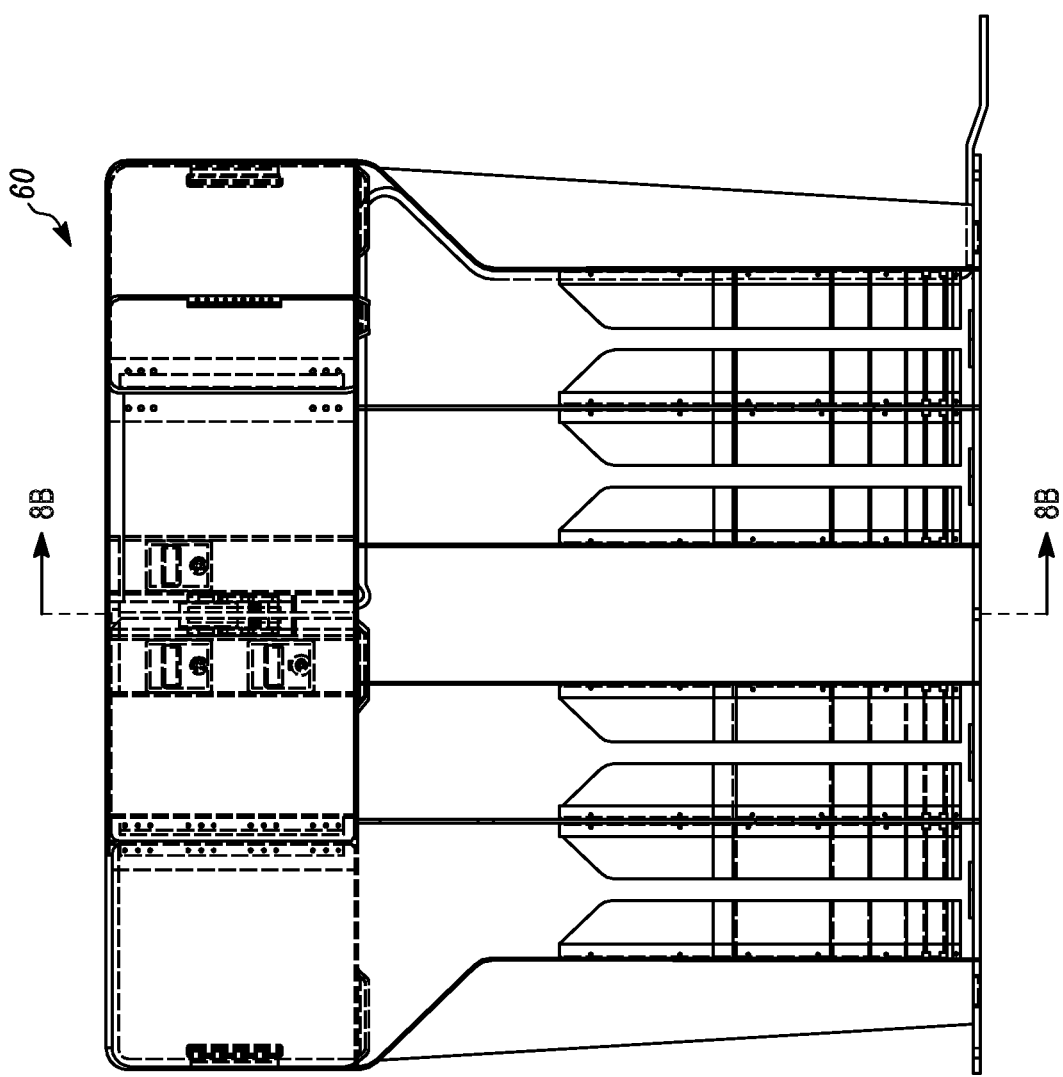

FIGS. 8A and 8B are a front view and opposite side view of the embodiment of the bicycle storage unit 60 shown in FIGS. 6A to 6D, taken at line 8B-8B.

FIG. 8B shows the storage compartments 80 with a door opened 90 degrees. The inside panels form the inner walls on which are installed power units and connector, and provides a heat sink to the power units. The chassis is aluminum (in disclosed embodiments the entire chassis is formed of aluminum), and is very thermally conductive, forming a heat diffusion heat sink frame.

The entire chassis of the unit is aluminum made with sheets and plates from 0.0125 inches to 0.375 inches thick.

Moreover, the aluminum locker is electrically conductive, and forms an almost complete, solid Faraday cage around the power unit, and any other electronics placed within the storage locker (e.g., smart phone). Thus, all electronics mounted or placed within the storage lockers, including all communication electronics, are protected by the nearly complete Faraday cage, protecting from all damaging waves, including electro-magnetic waves or electro-magnetic pulse (EMP) energy, and/or from the sun.

Preferably, the entire storage locker is corrosion resistant.

Figure 9:
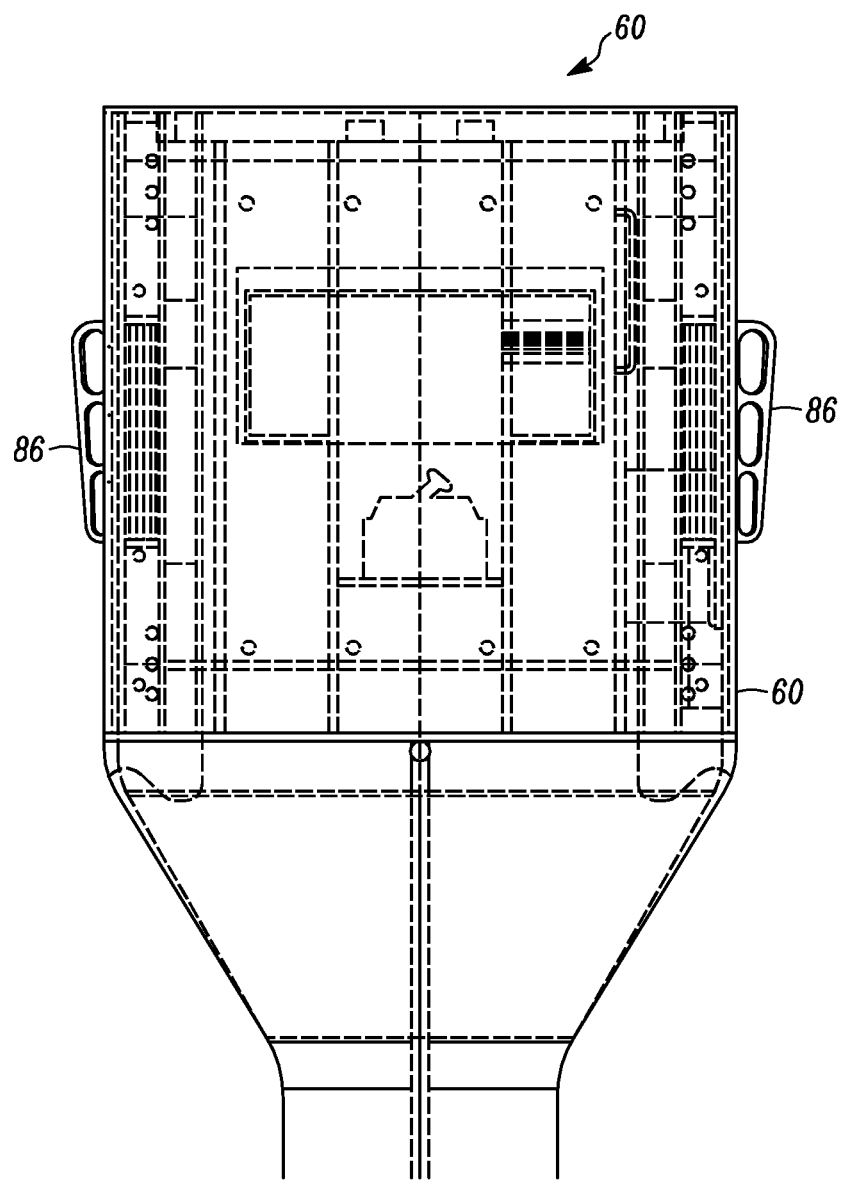
FIG. 9 shows the cut-away view of FIG. 8B in more detail.

FIG. 9 shows the cut-away view of FIG. 8B in more detail.

The handles 86 are multi-hole brackets that are installed at each locker door frame as a means to lock the door using a padlock, etc. Also, there is a slot in the locker door for the handles 86 to pass through. The handle 86 is a drilled bracket designed to enable the user to secure locker content (or a charging device or portable e-bike battery) using any type of 'cyclist's lock' or conventional lock through the handles 86. Also, there can be other types of door locks installed, like standard 'key type' door locks, electronic keypads door locks, Wi-Fi activated electronic door lock, etc. The locking mechanism can also include one in which a payment is collected from a user (e.g., a credit card swipe, etc.)

Figure 10:
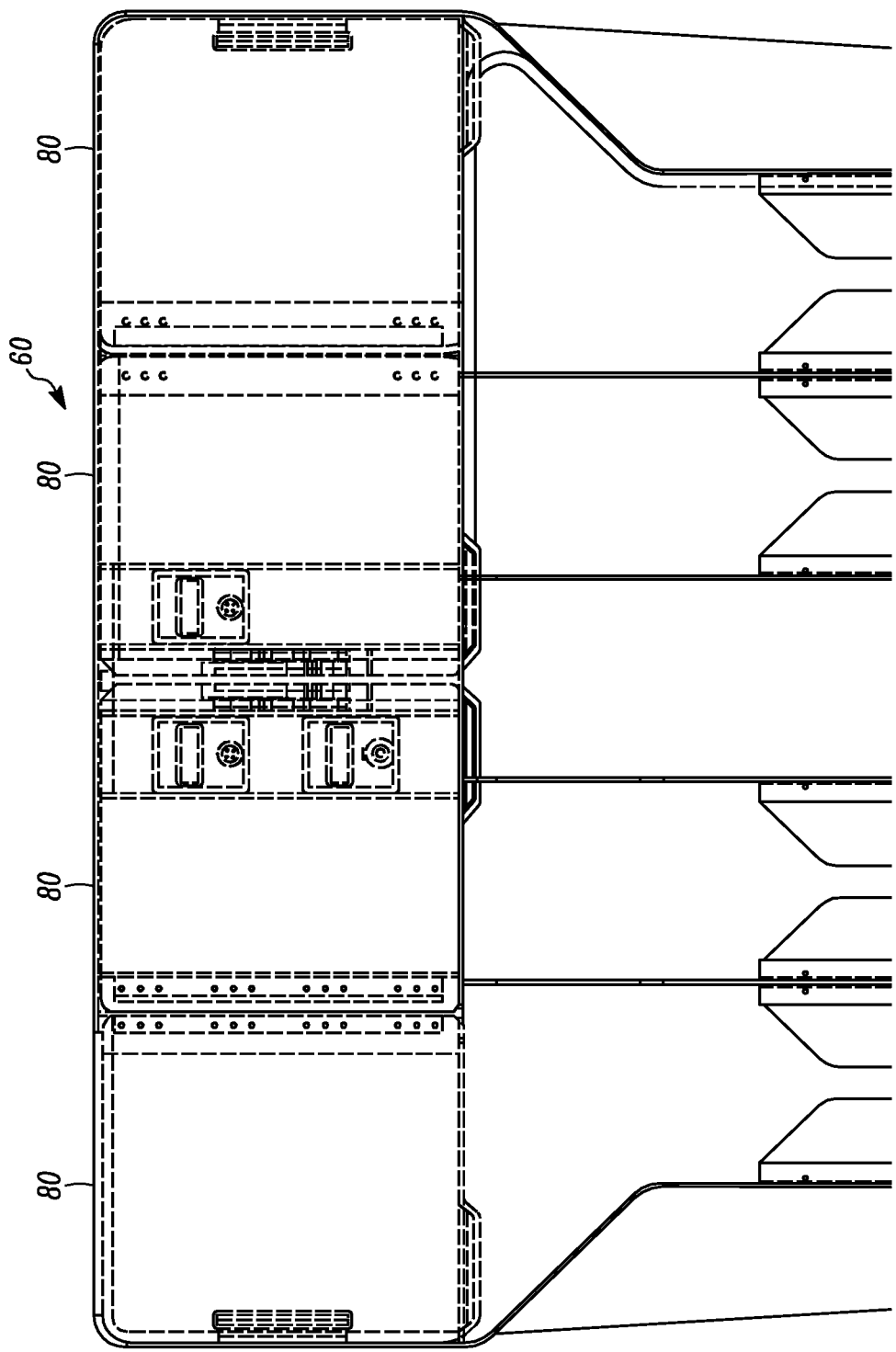
FIG. 10 shows the cut-away view of FIG. 8A in more detail.

FIG. 10 shows the cut-away view of FIG. 8A in more detail.

Figure 11:
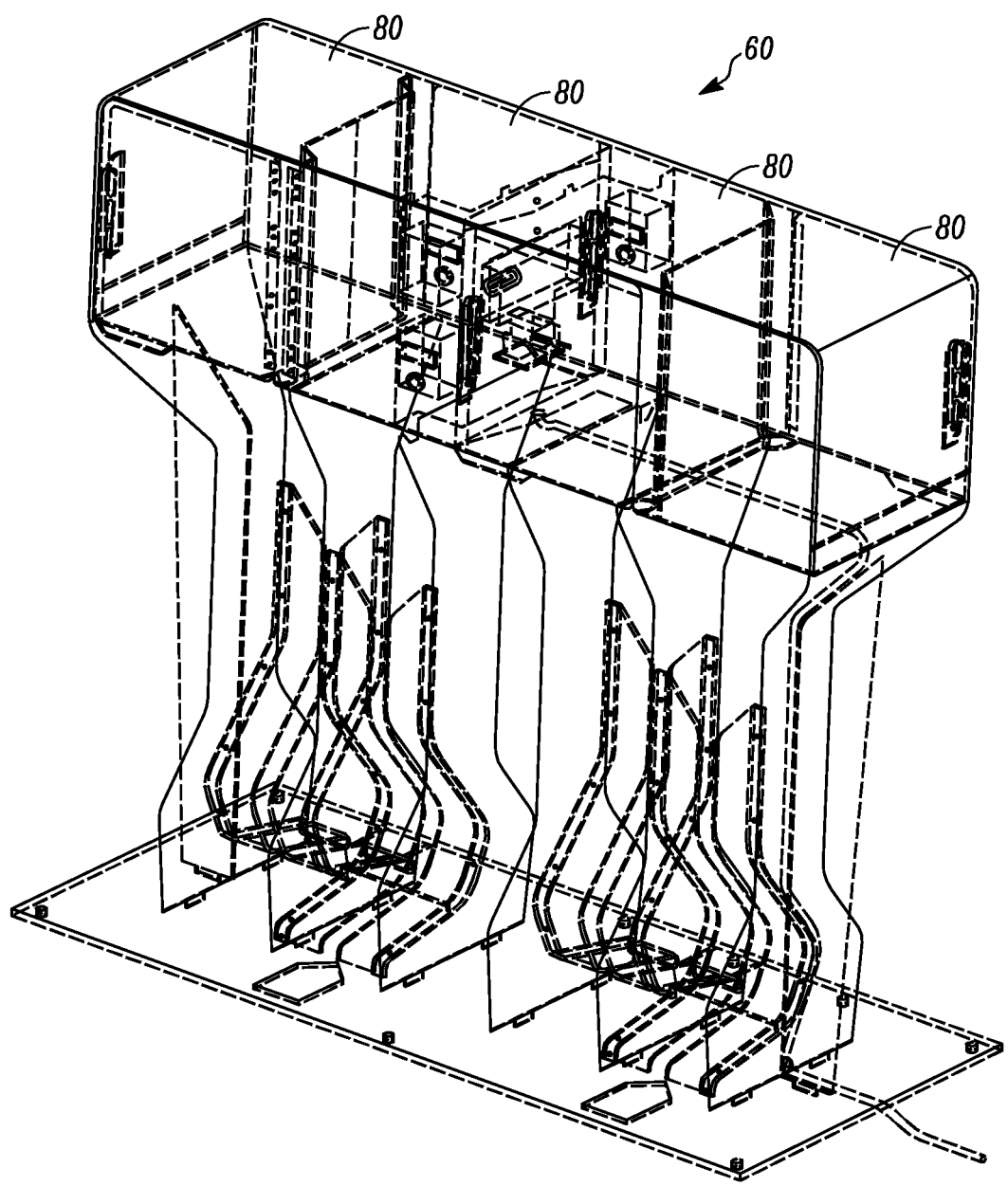
FIG. 11 is a perspective view of the embodiment of FIGS. 6A to 6D, showing important elements and features integrated into the bicycle storage unit.

FIG. 11 is a perspective view of the embodiment of FIGS. 6A to 6D, showing important elements and features integrated into the bicycle storage unit.

Figure 12:
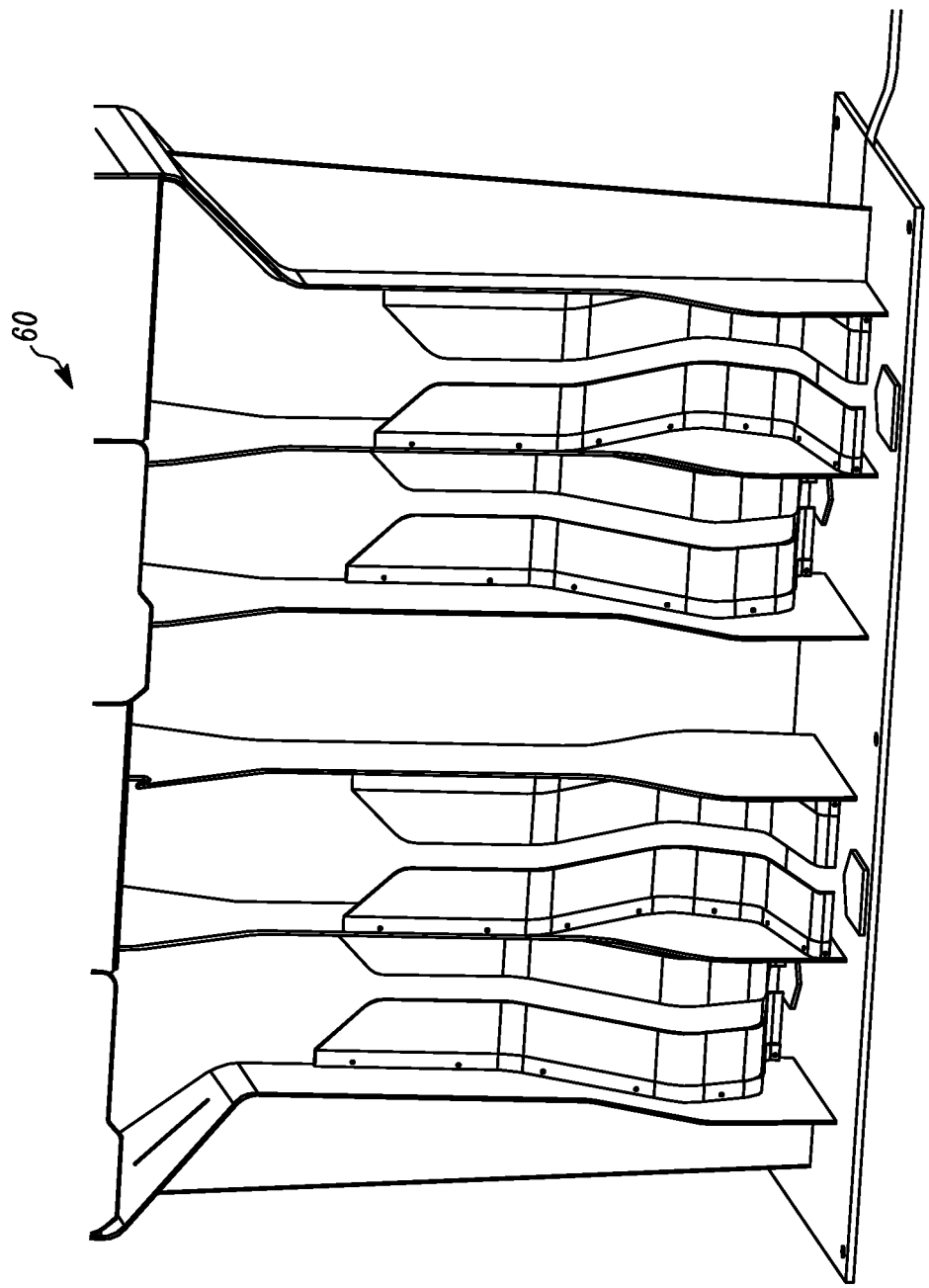
FIG. 12 shows the rubber strips for holding up the parked bicycle, in accordance with the principles of the present invention.

FIG. 12 shows the rubber strips for holding up the parked bicycle, in accordance with the principles of the present invention.

FIGS. 11 and 12 show not only the locking chain or cord, but also the important feature of a non-metallic flexible strip 620 (e.g., rubber strip) to protect bike finish from scratches. The non-metallic flexible strip 620 also maintains a parked bike straight up on its wheels.

Figure 13:
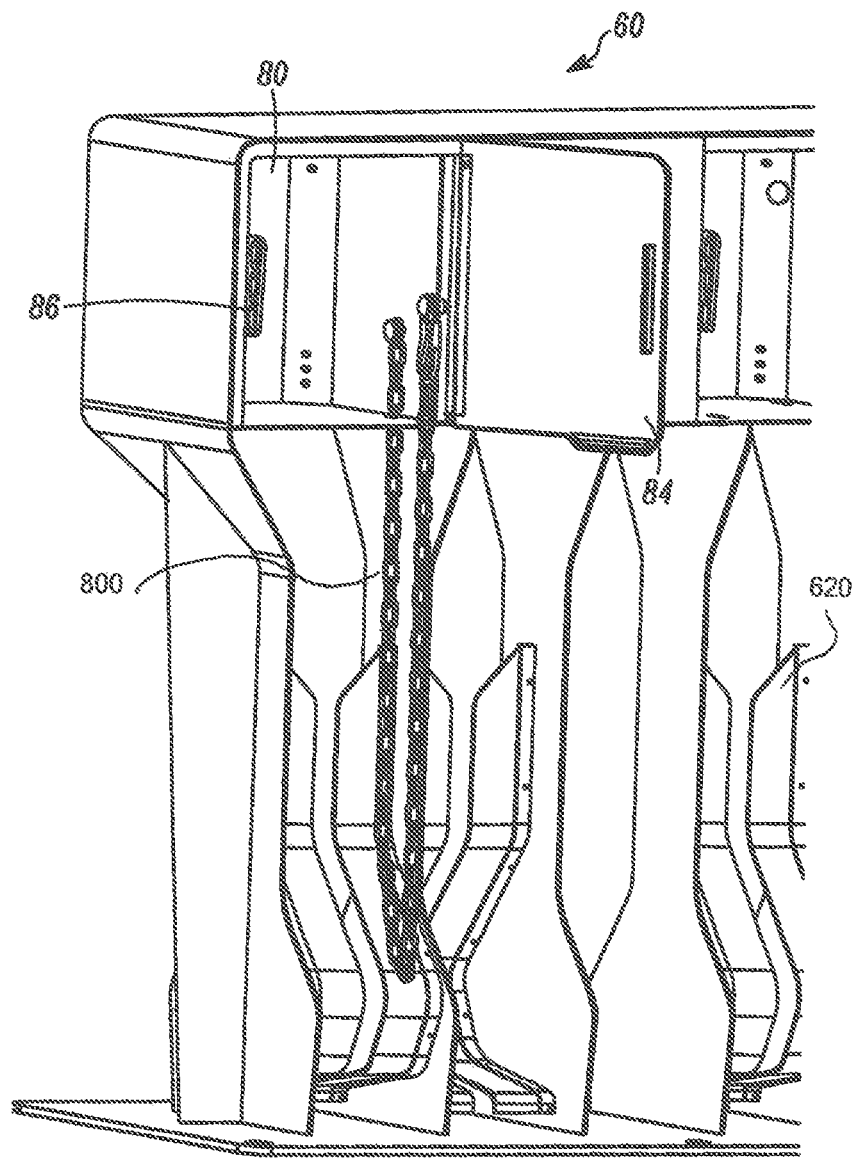
FIG. 13 shows the rubber strips for holding up the parked bicycle, as well as an exemplary lock chain with both ends secured within the storage locker.

FIG. 13 shows the flexible strips 620 for holding up the parked bicycle, as well as an exemplary lock chain with both ends secured within the storage locker.

A sufficiently long chain 800 with a flexible covering is installed at each 'parking station' with one end fixed on the inner wall of each locker, and the other end is clipped in a secured carabiner 810 (FIG. 32) or a secured hook. So and this way, both ends of the chain 800 are secured 'into' a storage compartment 80. Each storage compartment 80 has a chain 800, regardless on which side of the bicycle storage device 60 it is located. When the locker door is locked by the 'cyclist-user', both ends of the chain 800 are locked at the same time by the locking of the door, thus securing the bicycle.

The secured carabiner 810 or a secured hook (or lock) is solidly fixed on one of the walls inside each storage compartment 80. This is to secure one end of the chain 800, manual operation done by the 'cyclist-user'. Also a 'lockable' secured carabiner 810 or a secured hook can be installed.

Figure 14:
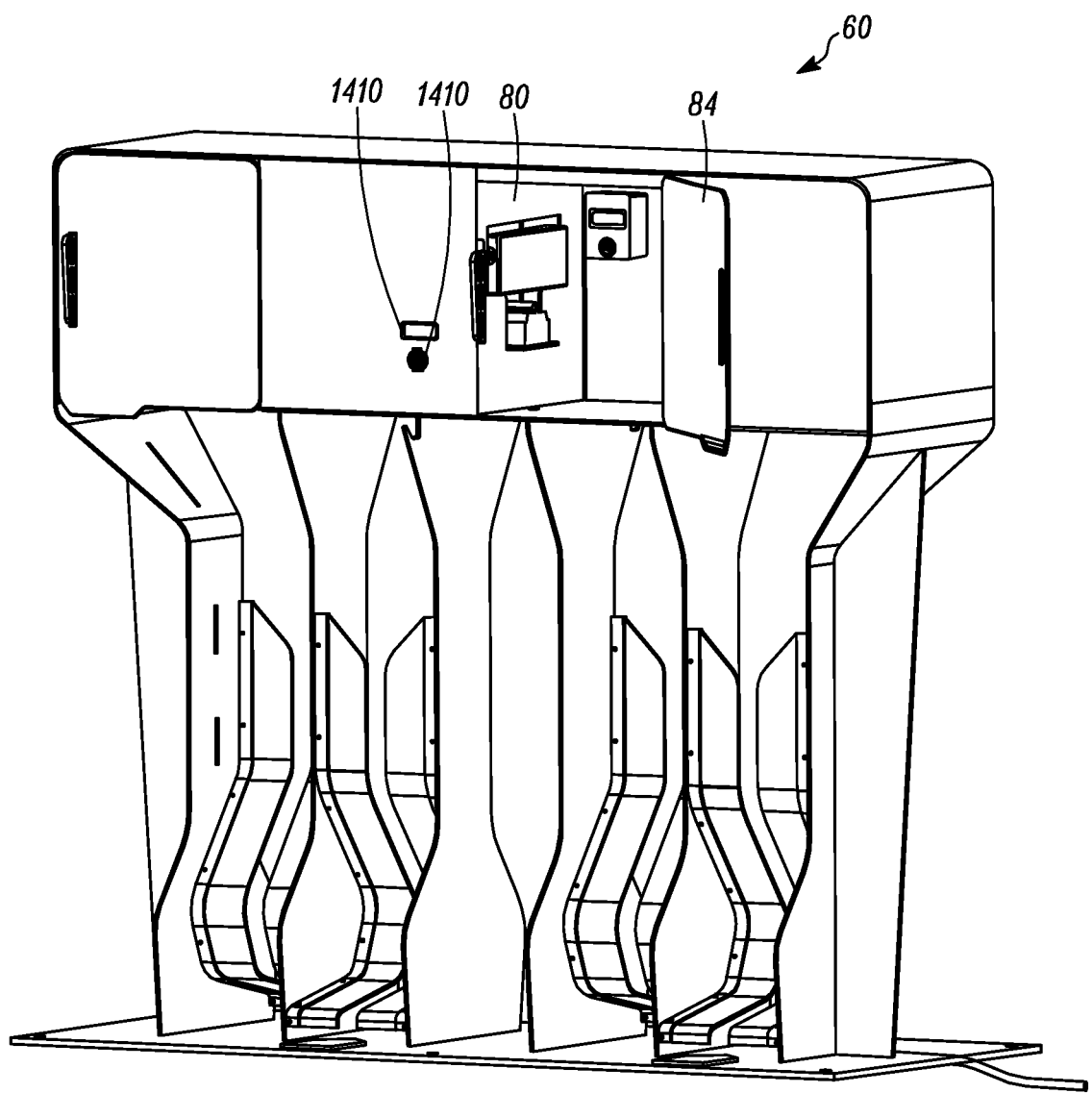
FIG. 14 shows an exemplary power unit and charger module inside the bicycle storage locker of the bicycle storage unit, in accordance with the principles of the present invention.

FIG. 14 shows an exemplary power unit and charger module inside the bicycle storage compartment locker 80 of the bicycle storage device 60, in accordance with the principles of the present invention.

A complete e-bike smart battery charger unit 910 (with or without display 920), and power supply for the same, can be installed into each and every storage compartment 80. This system includes a means of electrical power circuit protection or 'circuit breakers', it is also including a 'ground fault' protection apparatus. The power circuit is connected to a power unit, which power unit is mechanically fixed and in contact with a structural locker wall (being of conductive material) that is also acting as a heat sink, or a heat diffusion means. This structural locker wall can be of any shape size and or form.

The battery charger unit 910 (with or without display 920) can be installed with brackets, on a wall thickness and 'centered into' a special opening. This opening also enable the retrofitting of this electrical installation on previously sold bike storage device. The smart battery charger unit 910 can be enclosed with metal sheets or plates.

The storage compartments 80 also act as a Faraday cage around the smart battery charger unit 910 and any electronics placed within the storage compartment 80. The smart battery charger unit(s) 910 can also be installed under the storage compartments 80, or secured by special enclosures.

An electrical power cord may plug into the power grid to provide power to the smart battery charger unit(s) 910. The electrical power cord may be passed on and fixed to the chassis all the way to a connection box. Standard ASTM or CSA electrical installation norm does apply for such connection to grid. A solar panel array that would be fixed to the bicycle storage device 60 (with power storing equipment) can replace electrical connection to the grid.

The smart battery charger unit(s) 910 are preferably installed into each storage compartment 80. The smart battery charger unit(s) 910 can be fixed to any inner wall of the storage compartment 80. This smart electronic battery charger unit 910 can be protected from impact by a removable sheet metal covering, also fixed inside the locker. Wiring coming from a power supply unit is needed to power up the smart electronic battery charger unit 910. The smart electronic battery charger unit 910 can also be installed under the storage compartment 80, or secured by special enclosures.

A recharge connector or plug 1410 can be installed in every storage compartment 80. This plug 1410 enables the cyclist to recharge its e-bike battery pack from within the interior of the storage compartment 80. Most e-bikes batteries are removable, thus they can be physically placed inside the storage compartment 80, secured by closing the door to the storage compartment 80, and recharged from within the storage compartment 80 with the locker locked. The e-bike battery pack could instead stay mounted on the e-bike, and be connected with a cable from the connector plug 1410 from with in the storage compartment 80, and long enough for reaching the e-bike battery pack. In disclosed embodiments there is a slot opening in the bottom or floor of the storage compartment 80 to let a smart charger cable 1400 pass therethrough. This connector or plug 1410 can be compatible with existing smart connection cables.

A standard 120 volts receptacle (norm) can be installed inside or outside of the bicycle storage device 60.

FIG. 14 shows the smart battery charger unit 910 inside the storage compartment 60. The plug 1410 is provided for recharge of, e.g., an e-bike or smart phone. Shown in the exemplary embodiment of FIG. 14 are the electronic smart battery charger unit 910, the electronic smart charger display 920, and the plug for a charger cable 1410 (e.g., a smart charger cable 1400).

The smart charger cable 1400 may have a magnetic connector (and associated protection in case of surcharge) provided from within the secured interior of the storage compartment 80 of the bicycle storage device 60.

Many other types of connectors or plugs 1410 can be installed inside (and also outside) of the storage compartment 80, on the bicycle storage device 60. The plugs 1410 preferably point outside through special openings in the outside walls or floor of the storage compartment 80 to provide access to a recharging capability to additional users in addition to those making use of the secured storage compartments 60.

The connector or plugs 1410 are preferably selected as suitable for recharging not only electric bikes (e-bikes) but any other personal electric vehicles, such as e-motos, and small e-cars (three wheels or more).

The bicycle storage device 60 can be equipped with automatically activated LED lighting, inside the secured storage compartments 60 and/or outside the secured storage compartments 60, and/or above the bicycle storage device 60.

Figure 15:
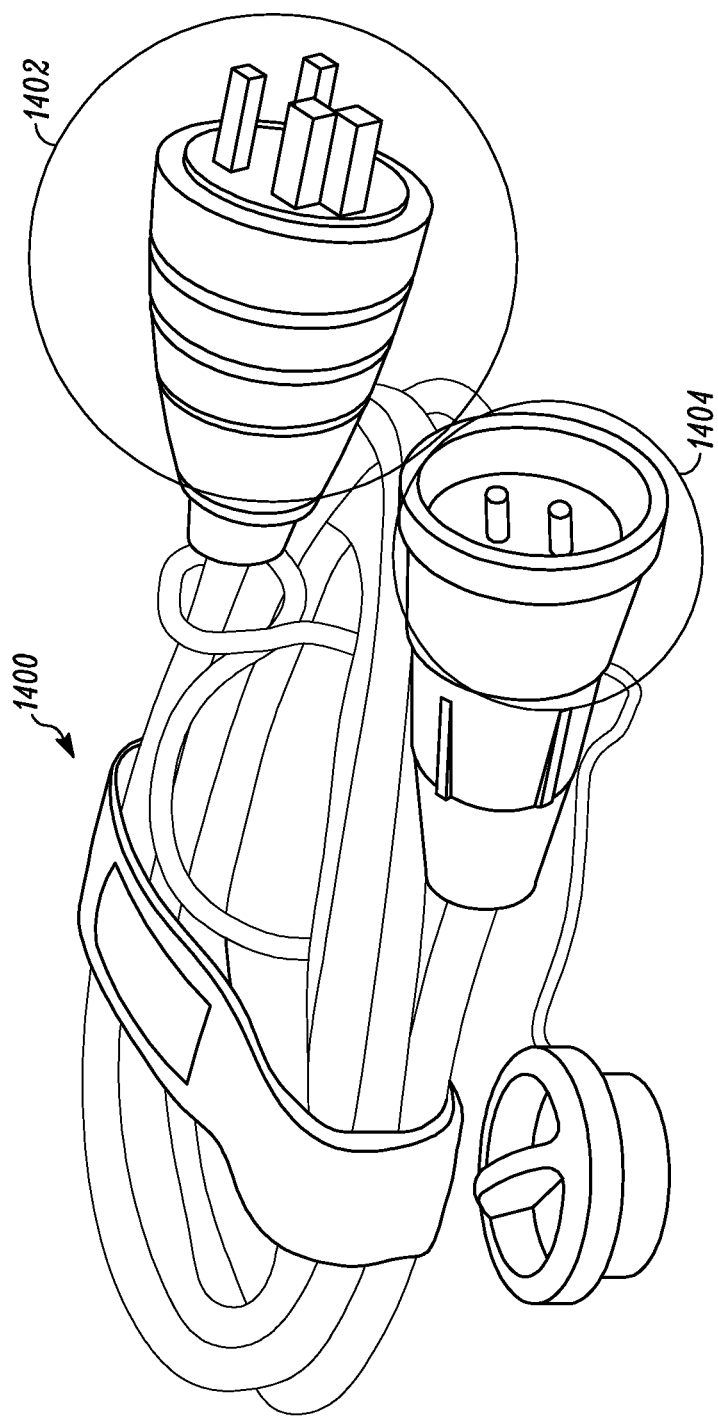
FIG. 15 shows an exemplary smart charger cable.

A series of bike maintenance tools (not shown) can be installed or otherwise secured to the bicycle storage device 60 with cables, or otherwise attached to the outside of the bicycle storage device 60. FIG. 15 shows an exemplary smart charger cable 1400. A first end 1402 of the smart charger cable 1400 (in the disclosed embodiment for a Bosch Electric System) connects to the bike. Currently, there are more than 20 different cables commercially available from bike-energy in Austria. These 20 different cables cover probably more than 90% of the eBike brands currently commercially available. Bike-energy provides new cable connectors whenever a new battery technology becomes available. There is no difference in the physical connectors across the different markets (Europe, Asia and North America).

The second, other end 1404 of the smart charger cable 1400 is a magnetic connector in the disclosed embodiments, standard for each of the 20 different cables. Once plugged, the smart battery charger unit 910 recognizes the battery characteristics and manufacturer (displayed on the small display 920 monitor above the connector or plug 1410).

The smart battery charger unit 910 protects the battery maximally when charging. Each docked battery is charged exactly with the original charge log. In the first phase, the smart battery charger unit 910 loads very slowly, in the last phase the feed is lowered rapidly. Thus, the battery is spared maximum and increased life.

The smart battery charger unit 910 and the smart charger cable 1400 are safe to operate in any weather. There is a battery-saving effect due to an intelligent charging system. The charging electronics recognize when the battery of the e-bike is full and switch off automatically.

Preferably the smart battery charger unit 910 is a rapid charge system.

Preferably, the smart battery charger unit 910 and the smart charger cable 1400 are completely weatherproof, thus enabling charging without any risk at any time due to weather (e.g., due to rain, snow, etc.) Thus, there is no danger when it rains briefly and the e-bike hangs on the smart battery charger unit 910.

Figure 16:
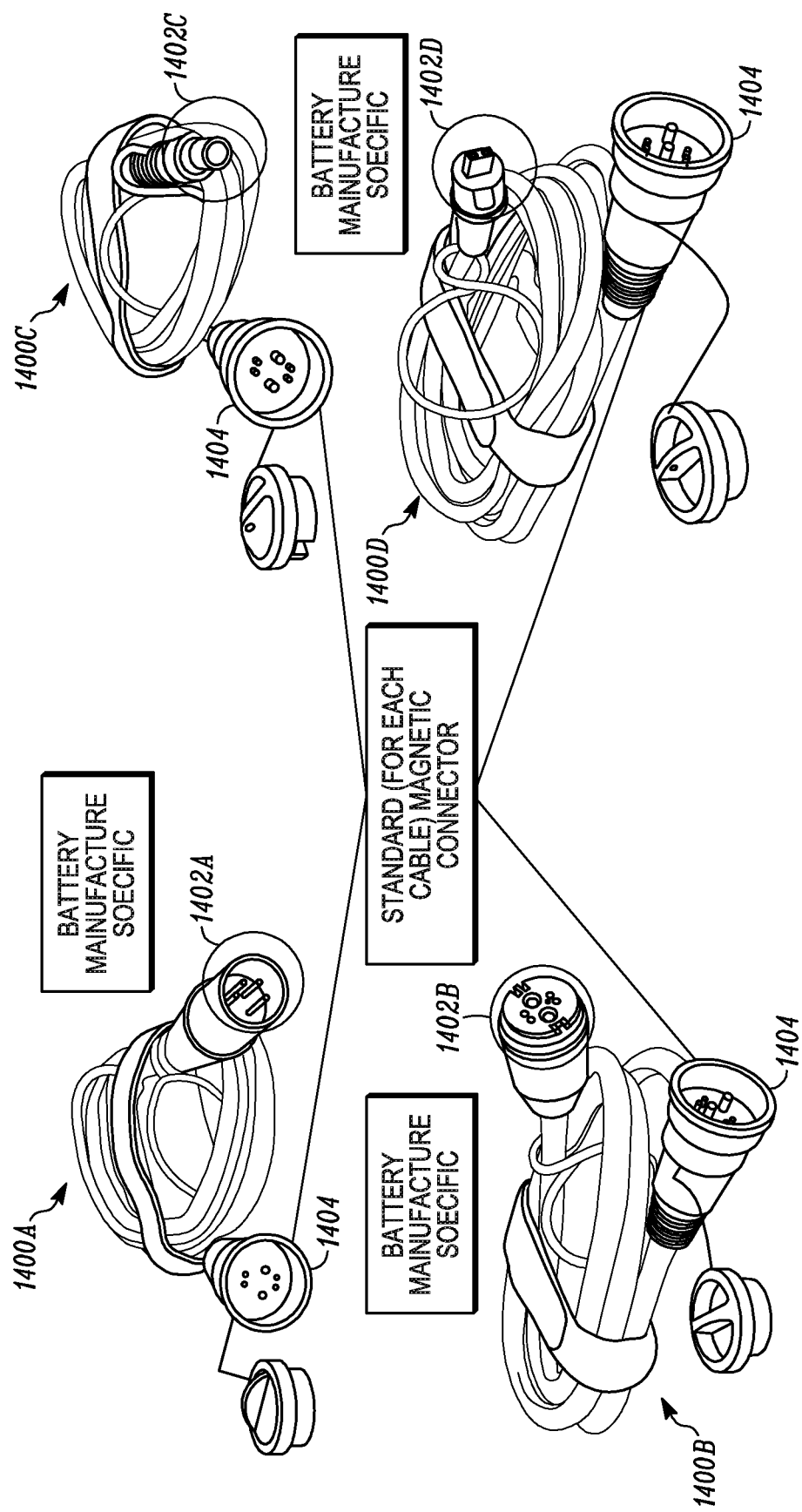
FIG. 16 shows exemplary different e-bike charger cables.

FIG. 16 shows exemplary different e-bike charger cables 1400a-1400d.

FIG. 16 shows four different exemplary e-bike charger cables 1400a-1400d, each with a battery manufacturer specific first end 1402a-1402d. The other, second end 1404 of each of the smart charger cables 1400a-1400d are a standard magnetic connector for mating with the connector or plug 1410.

One or more loudspeakers (not shown) could be mounted in the bicycle storage unit 80, e.g., under the storage compartments 60. This would provide a convenient and distributed source of sound or music in appropriate locations, e.g., within proximity of a BMX park, or mountain bike park such as along the trail of a mountain bike park, or even around a skateboard park. Audio to the speakers may be wired, or more preferably provided by Bluetooth communication from a central audio source.

Figure 17:
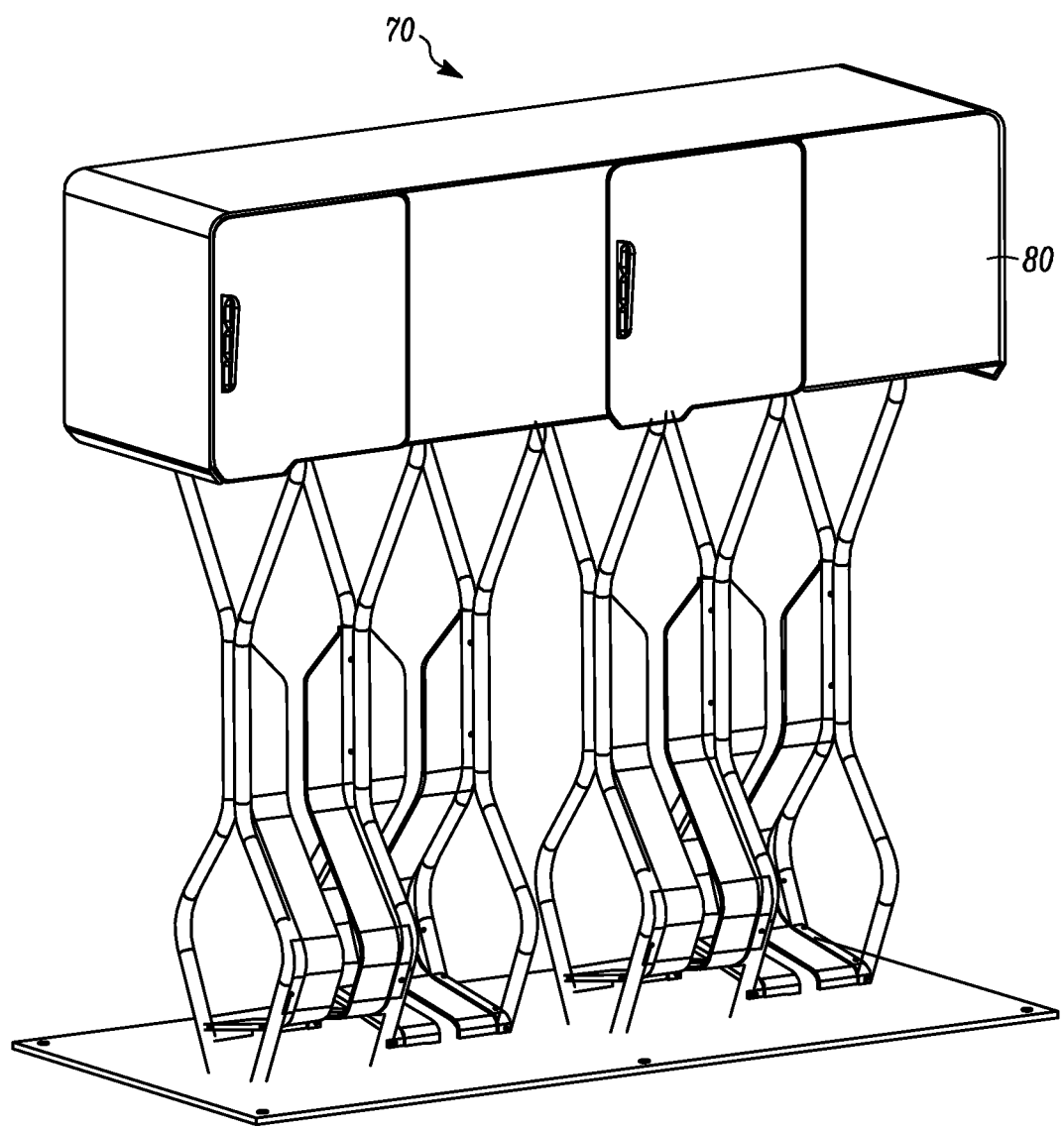
FIG. 17 is an exemplary bicycle storage unit having a vertical pipe structure, in accordance with another embodiment of the present invention.

FIG. 17 is an exemplary bicycle storage unit 70 having a vertical structure made out of pipe, in accordance with another embodiment of the present invention.

Figure 18B:
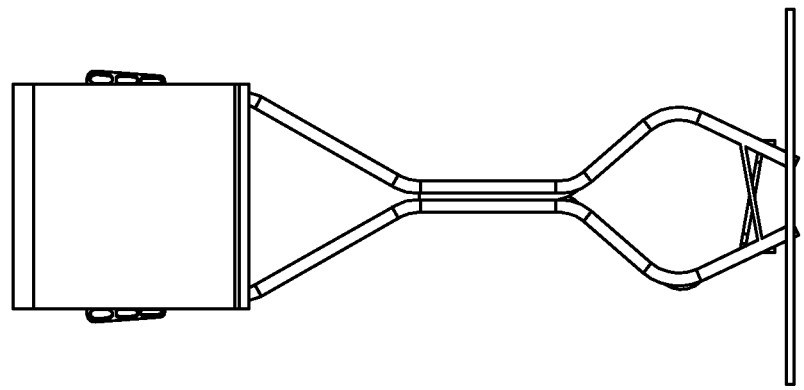
FIGS. 18A to 18C are a front view, other side view, and top view, of the embodiment shown in FIG. 17.
Figure 18A:
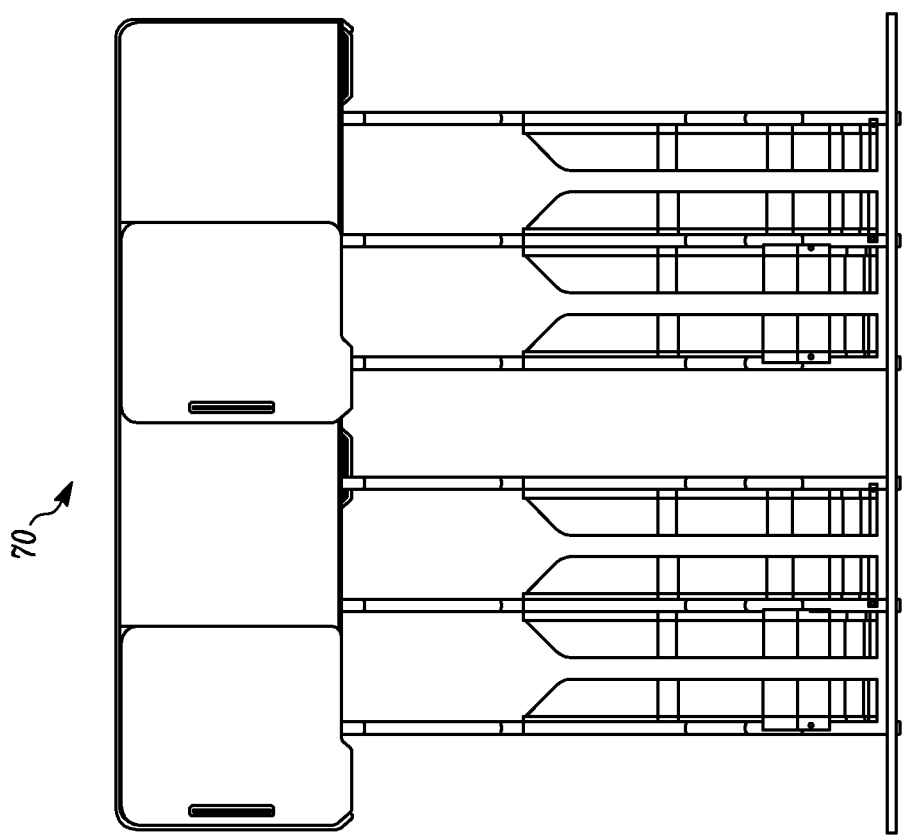
Figure 18C:
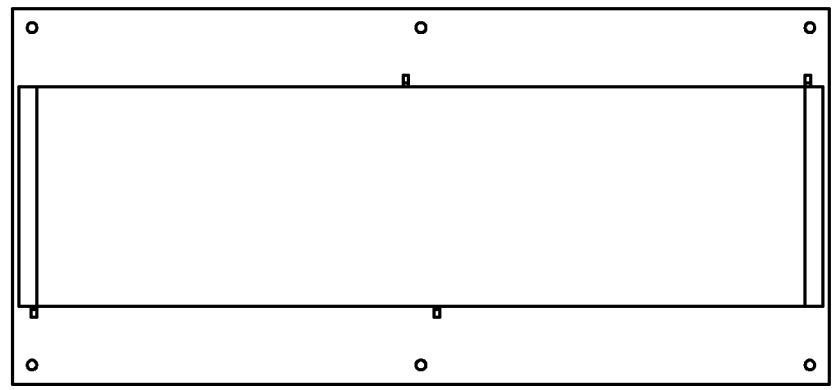

FIGS. 18A to 18C are a front view, other side view, and top view, of the embodiment of the bicycle storage unit 70 shown in FIG. 17.

Figure 19:
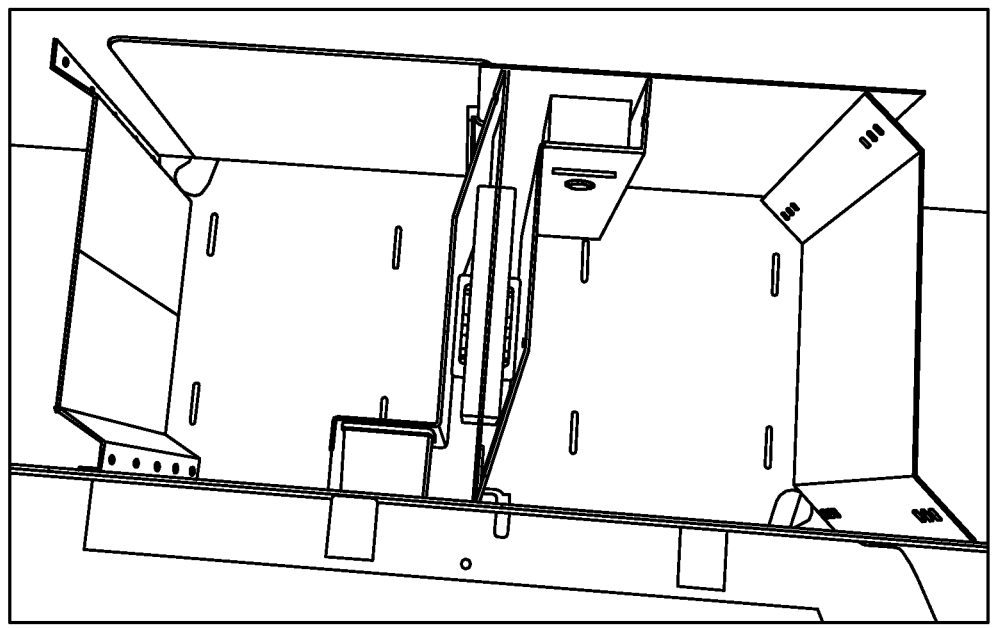
FIG. 19 is a view showing all the inner walls and components seen from above, with the roof panel of the lockers removed.

FIG. 19 is a view showing all the inner walls and components seen from above, with the roof panel of the lockers removed. The central component is the power supply to the smart battery charger unit 910 that is installed with a bracket into an opening in the central wall, for space saving reasons. The two squarish components toward the top and bottom of the figure are the smart battery charger units 910 with included plug and display. The smart battery charger units 910 are connected to the power supply. The smart battery charger units 910 are fixed to a folded sheet metal. In FIG. 19 two smart battery charger units 910 are shown, installed symmetrically, rotated mirrored from the central wall. The bents wall on both sides of FIG. 19 represent separation walls between storage compartments 80 at extremities.

Figure 20:
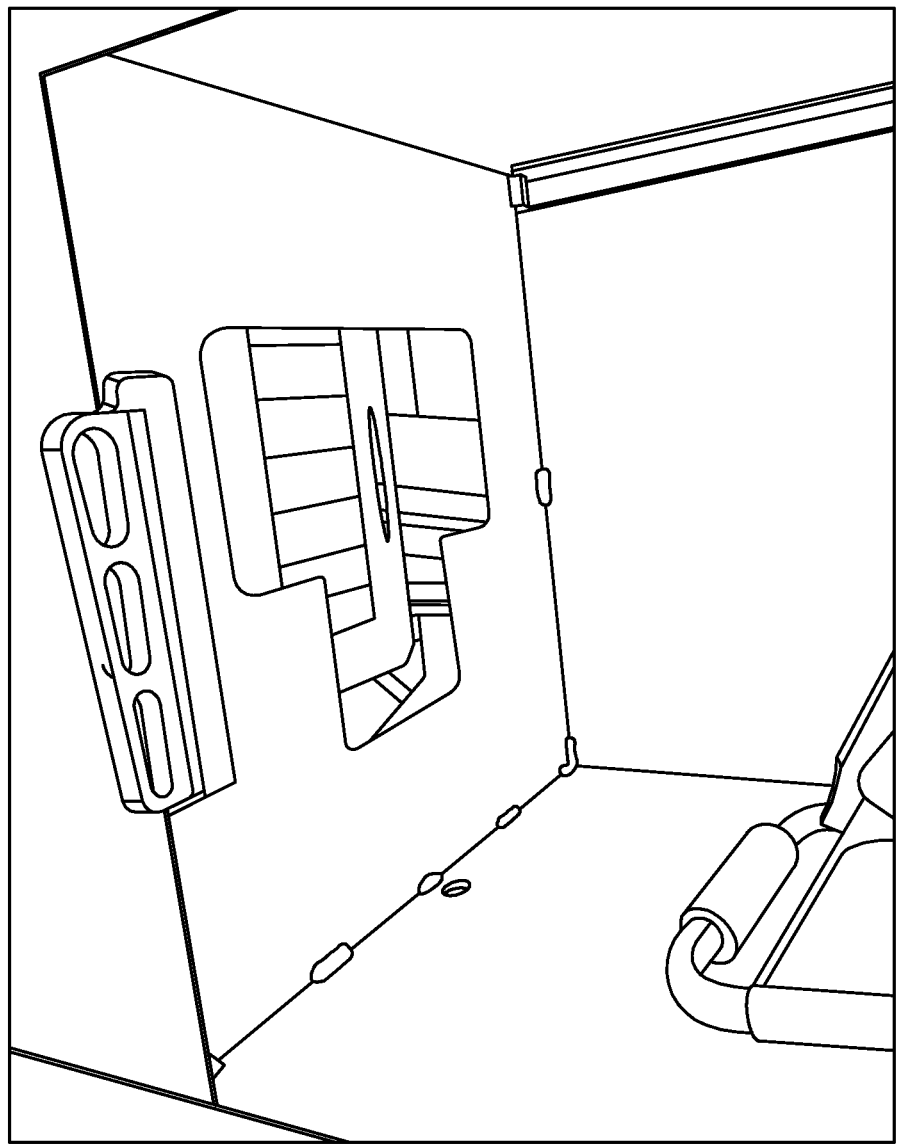
FIG. 20 shows the inner central walls into the lockers.

FIG. 20 shows the inner central walls into the storage compartments 80, with an access opening cut out large enough in order to insert the power supply for the smart battery charger units 910 in the largest portion of the opening. The smaller portion at the bottom of the access opening allows insertion of circuit protection (breakers).

Figure 21:
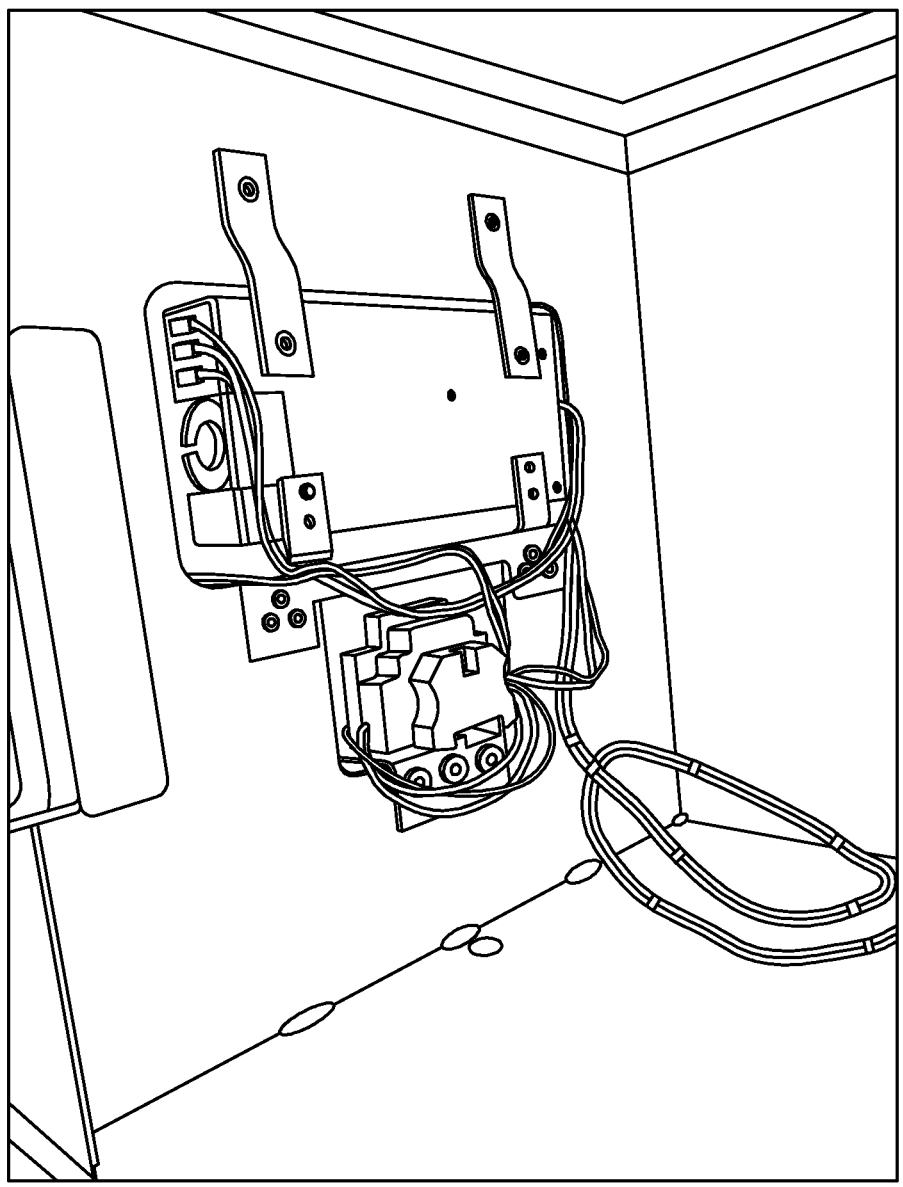
FIG. 21 shows the power supply for the smart battery charger units.

FIG. 21 shows the power supply for the smart battery charger units 910 securably mounted inside the storage compartment 80 through the central wall opening fixed with brackets. Circuit breakers are installed in the lower opening portion (also fixed with brackets). FIG. 21 also shows required electrical wiring, including wiring to the smart battery charger units 910.

Figure 22:
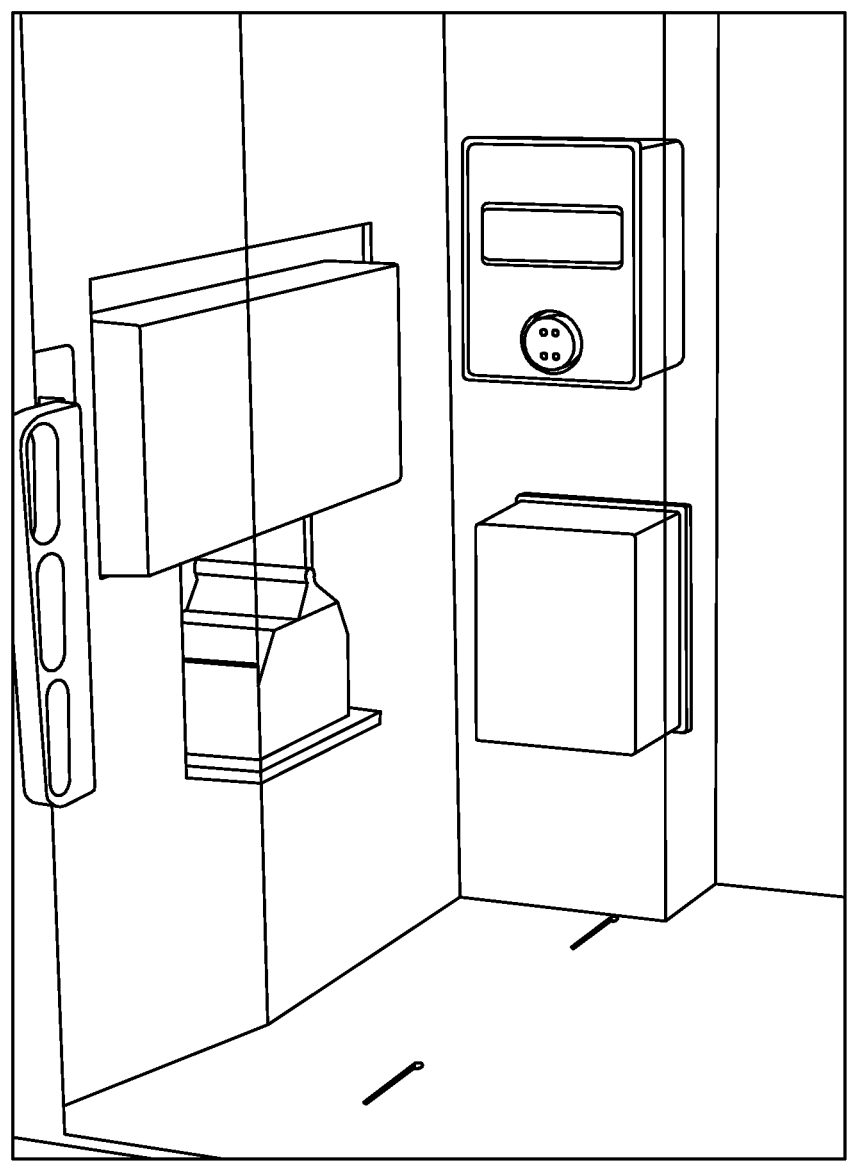
FIG. 22 shows inside the locker.

FIG. 22 shows inside the storage compartment 60 (depicted as if the metal panel behind which the power supply is mounted were transparent). The metal panel is not transparent in this embodiment, the transparency is merely for aid in description hereof.

Through the transparent surface, the central wall opening can be seen in which the power supply is installed and fixed with brackets. The circuit breakers are mounted in the lower opening portion also fixed with brackets. FIG. 22 also shows the installed smart battery charger unit 910. The smart battery charger unit 910 includes the recharge connector or plug 1410 and display 920. A second smart battery charger unit 910 is shown in shadow below the smart battery charger unit 910 facing the forward opening of the locker 80. The lower smart battery charger unit 910 points toward the outside of the outside wall with special holes and opening, enabling the plug and display to be visible from outside the secured lockers.

Figure 23:
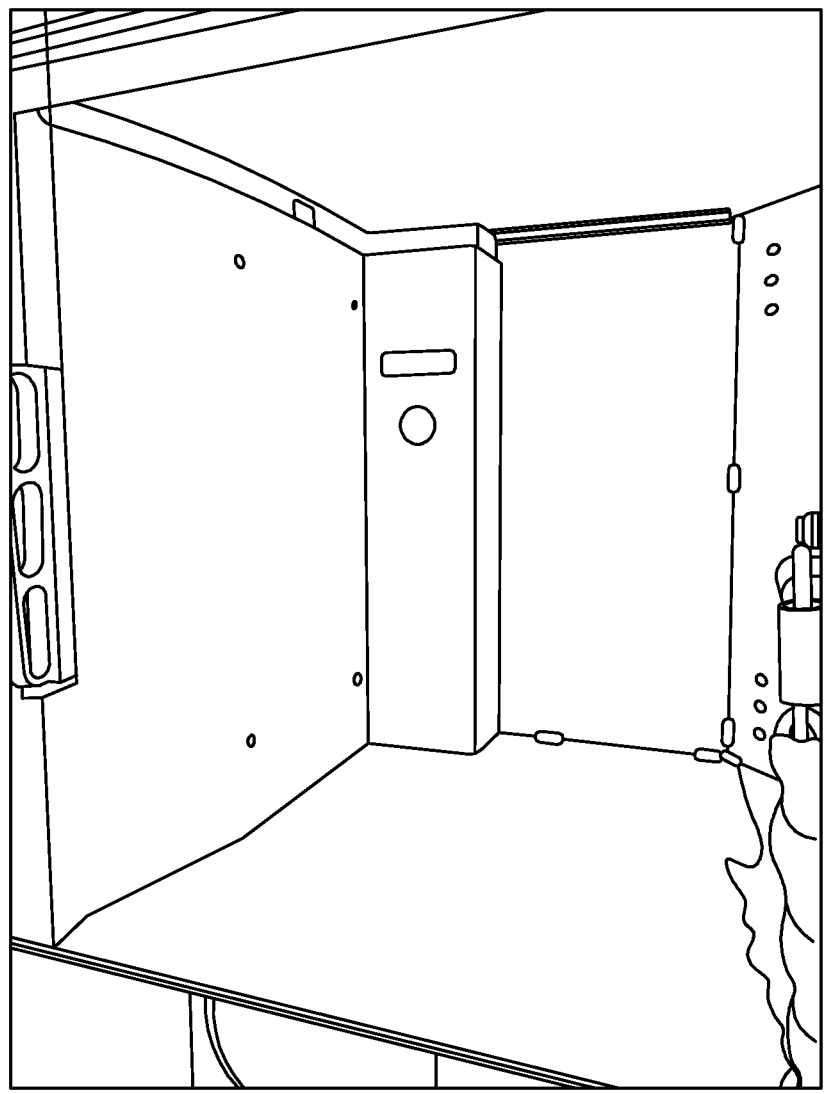
FIG. 23 shows a folded sheet metal enclosure cover during assembly of the bike storage unit.

FIG. 23 shows a folded sheet metal enclosure cover during assembly of the bicycle storage device 60. The sheet metal enclosure cover hides and protects the power supply, circuit breakers and smart battery charger units 910. The sheet metal enclosure also acts as a heat sink for diffusion of heat generated by the power supply, smart battery charger unit 910, and other electronics.

Openings in the sheet metal enclosure enable the display 920 and plug 1410 of the smart battery charger unit 910 to be accessible and visible within the secured locker for the user. Normal air circulation between all the enclosure panels helps in cooling heat absorbed by the metal components. The sheet metal enclosure is preferably secured by use of special theft proof screws and other hardware.

Figure 24:
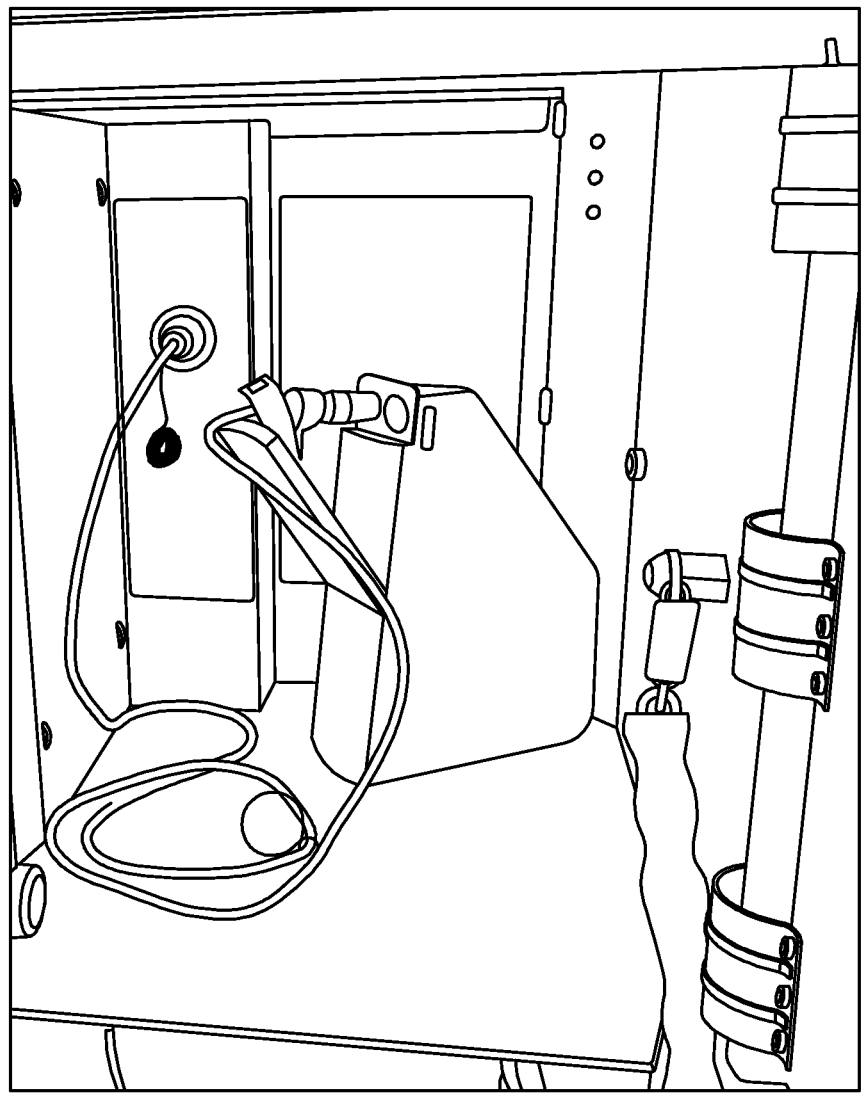
FIG. 24 shows a removable battery placed by a user in the storage locker and connected to the charger unit, in accordance with an embodiment of the present invention.

FIG. 24 shows a completed installation inside a secured storage compartment 80, and with a battery pack (removable) from an e-bike parked at the bicycle storage unit 60, connected by cable 1400 to the smart battery charger charging unit 910, and in charging mode. The enclosure cover is bolted to the inner wall bracket with visible instructions for the user. The smart charger cable 1400 is plugged into the recharge connector or plug 1410 to charge the battery within the secured storage interior of the storage compartment 80. The smart battery charger unit 910 includes a display 920 for diagnosis and recharge monitoring. An end of the bike locking chain 800 is secured in a carabiner 810, and the chain 800 passes through an opening against the door in the locker bottom plate. In other embodiments, the smart charger cable 1400 can be passed through the same opening in the locker bottom plate to connect between the plug 1410 and a battery when mounted within the e-bike.

Figure 25:
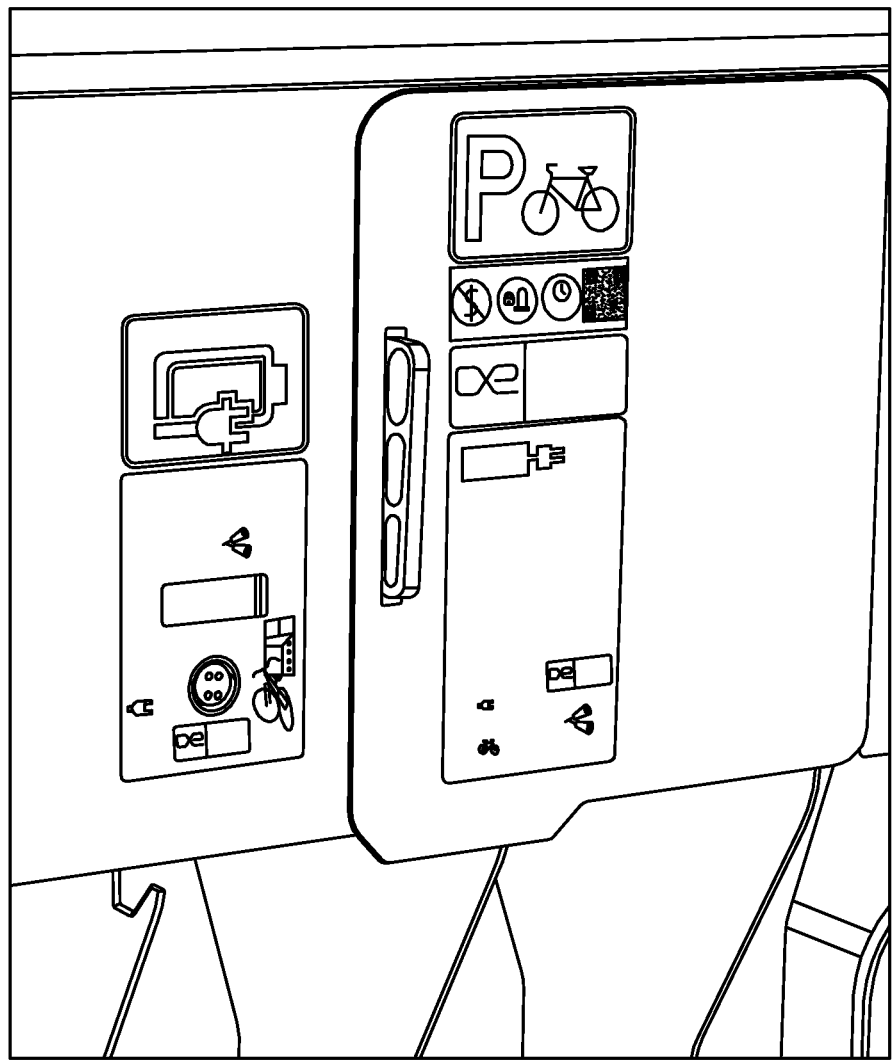
FIG. 25 shows an exemplary closed locker with visible instructions for the user.

FIG. 25 shows an exemplary closed storage compartment 80 with visible instructions for the user. An externally-accessible plug 1410 is made available external to the secured lockers. A smart charger cable 1400 may be connected to charge an appropriate battery in an unsecured manner. This is suitable for, e.g., an electric golf cart parked alongside the bicycle storage device 60.

The externally accessible plug 1410 to a smart battery charger unit 910 includes an externally visible display 920 (for diagnosis and recharge monitoring). In this case and as previously shown, the smart battery charger unit 910 is installed inside a secured locker, behind the outside wall but with cut-through holes for plug and display access external to a secured storage compartment 80.

FIG. 25 also shows the multi-hole bracket for applying a personal cyclist lock, and also shown is the slot in the locker door panel for letting the bracket through.

Figure 26:
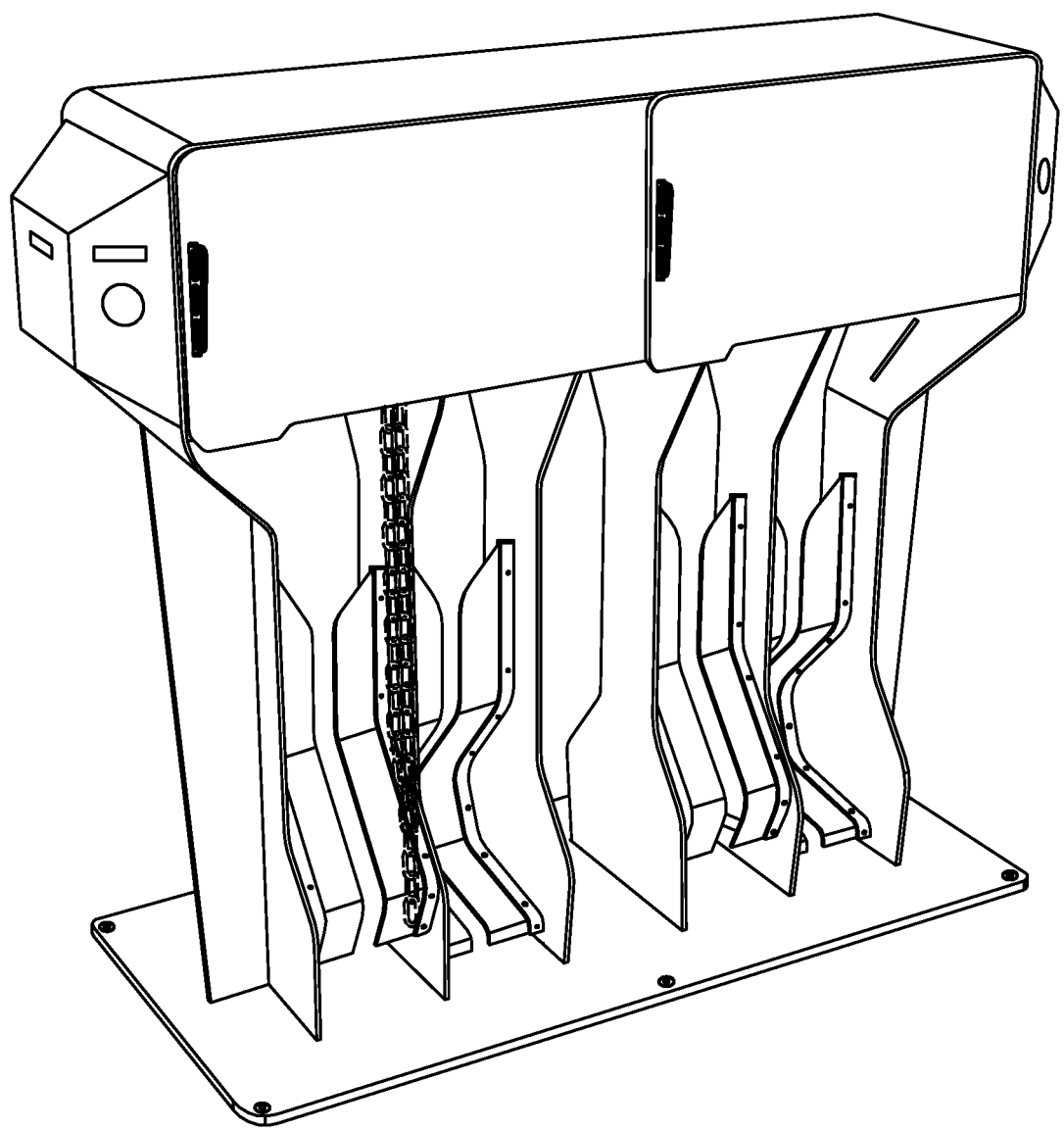
FIG. 26 is a rendering taken outside of the bicycle storage device.

FIG. 26 is a rendering taken outside of the bicycle storage device 60. FIG. 26 shows the possibility to install complete recharging systems as an add-on to an existing bicycle storage device 60. The system includes a power supply, smart battery charger unit 910, the plugs 1410 and the displays 920. This typical add-on would be installed outside of the storage compartment 80 at one end or both ends of the bicycle storage device 60. The bicycle storage device 60 is connected to a power grid with a regulated electrical wiring (norm). The bike lock chain 800 hangs out from the bottom of a storage compartment 80. Non-metallic strips 620 in which wheels of a bicycle or e-bike are to be inserted are also shown.

Figure 27:
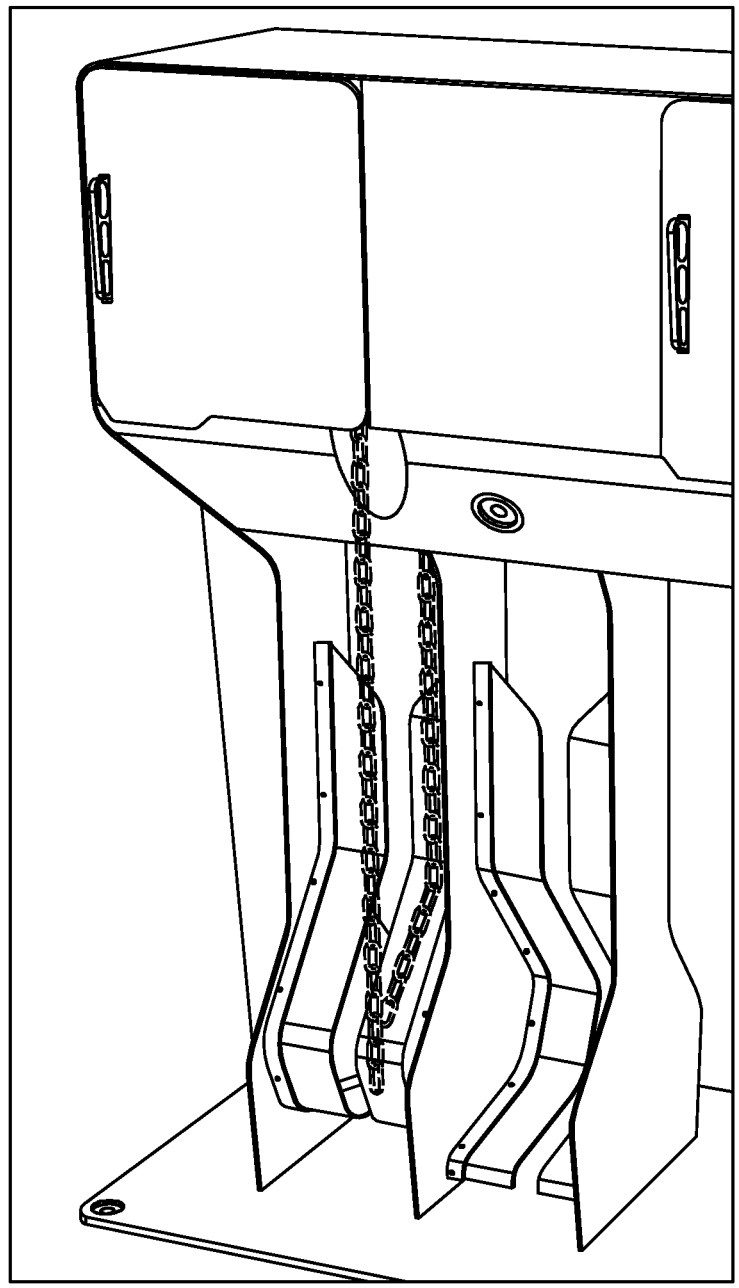

FIG. 27 is an external view of a bicycle storage device 60 showing the possibility to install a complete recharging system as add-on. The system includes a power supply, smart battery charger unit 910, the plugs 1410 and the displays 920. This typical add-on would be installed under the bottom plate of the storage compartments 80. The bicycle storage device 60 is connected to a local public power grid with regulated electrical wiring (norm). The lock chain 800 is visible exiting from the bottom of the secured storage compartments 80. Non-metallic strips 620 in which wheels of a bicycle or e-bike are to be inserted are also shown.

Figure 28:
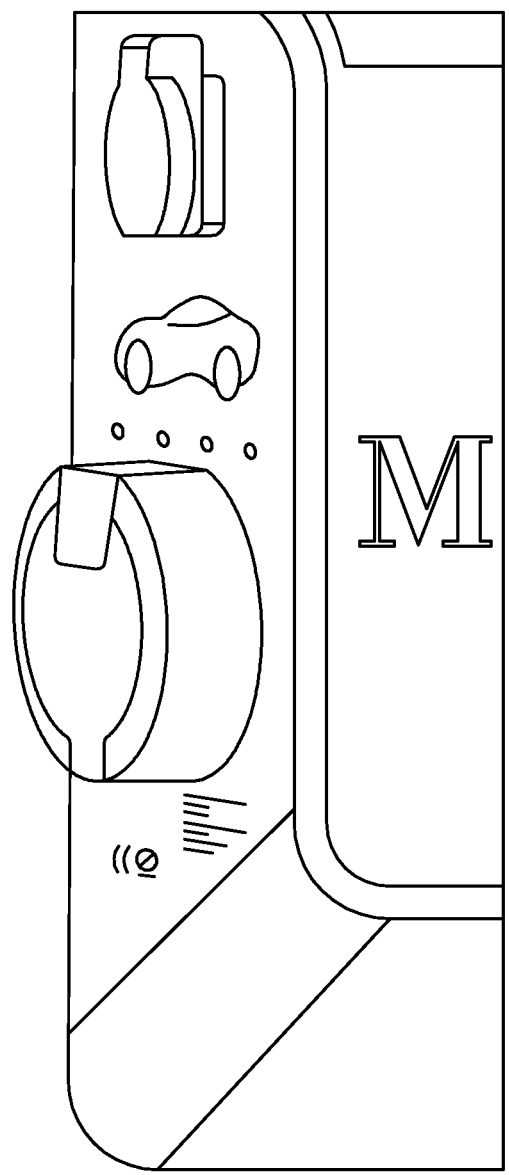
FIG. 28 is a rendering taken external to an exemplary bicycle storage device.

FIG. 28 is a rendering taken external of an exemplary bicycle storage device 60. FIG. 28 shows the possibility to install a complete recharging system as an add-on. The system includes a power supply, smart battery charger units 910, different plugs 1410 for providing the capability to charge a variety of electrics vehicle types, and the displays 920 (i.e.; plug for electric motorcycles, three wheels vehicles, etc.) This add-on would be installed external to the securable lockers at one end or both ends of the bicycle storage device 60. The bicycle storage device 60 is connected to a local power grid with a standard power cord.

Figure 29:
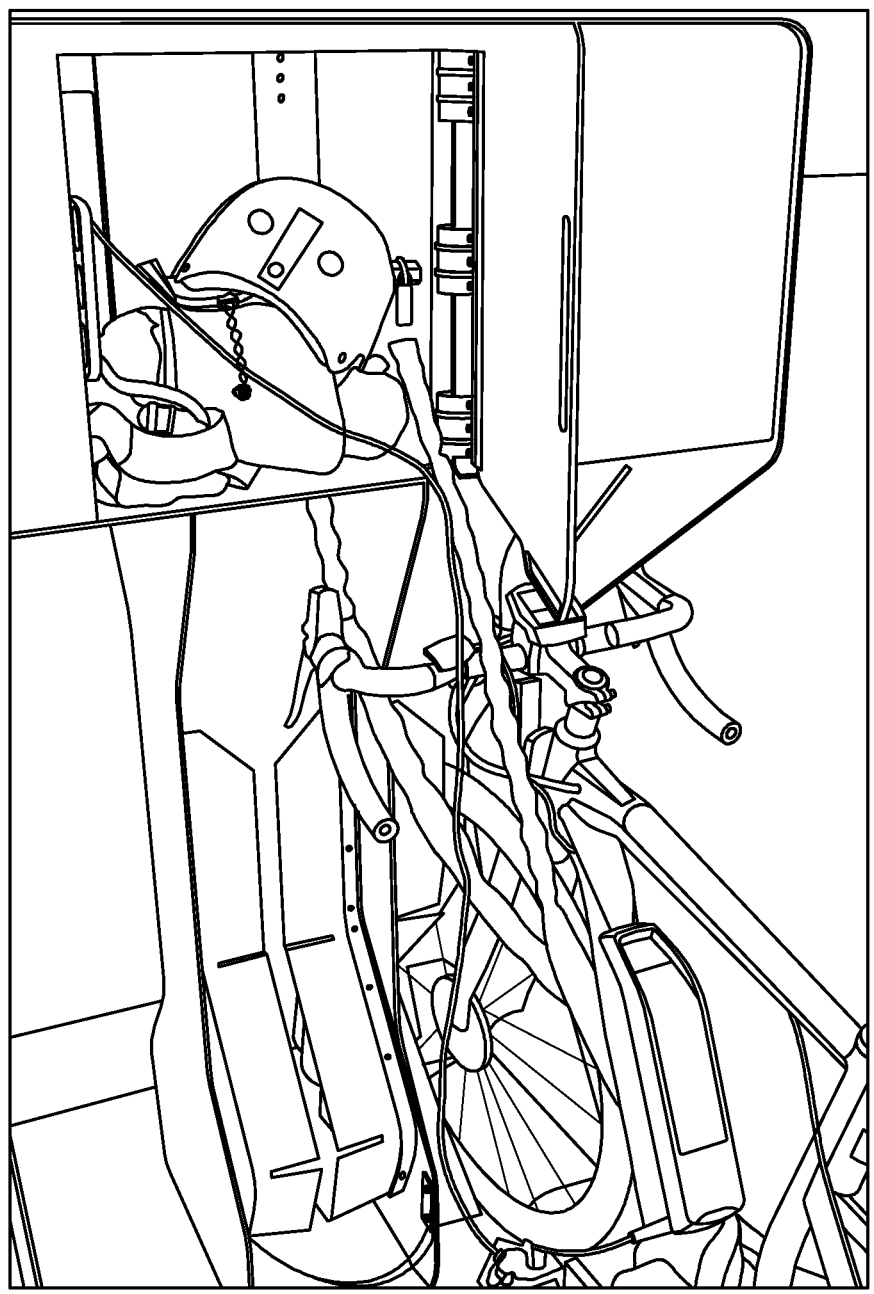
FIG. 29 shows a complete unit.

FIG. 29 shows a complete unit and the actual use for which it was invented. A bicycle is parked in the bicycle storage device 60, with its front bicycle wheel inserted between the strips of flexible materials 620 attached between the vertically oriented supporting structure 610. The long chain 800 with a covering is passed through the bike components to secure and lock the bicycle to the bicycle storage device 60. The chain 800 with covering then passes through an opening in the locker bottom plate, and is secured into the carabiner 810 fixed to the locker inside wall. The smart charger cable 1400 is also passed through the same opening in the bottom plate. The smart charger cable 1400 is connected between the smart battery charger unit 910 and the battery to be charged on the electric bike. The cyclist's personal articles such as their helmet, clothing, bags, etc, are securably stored in the storage compartment 80.

Figure 30:
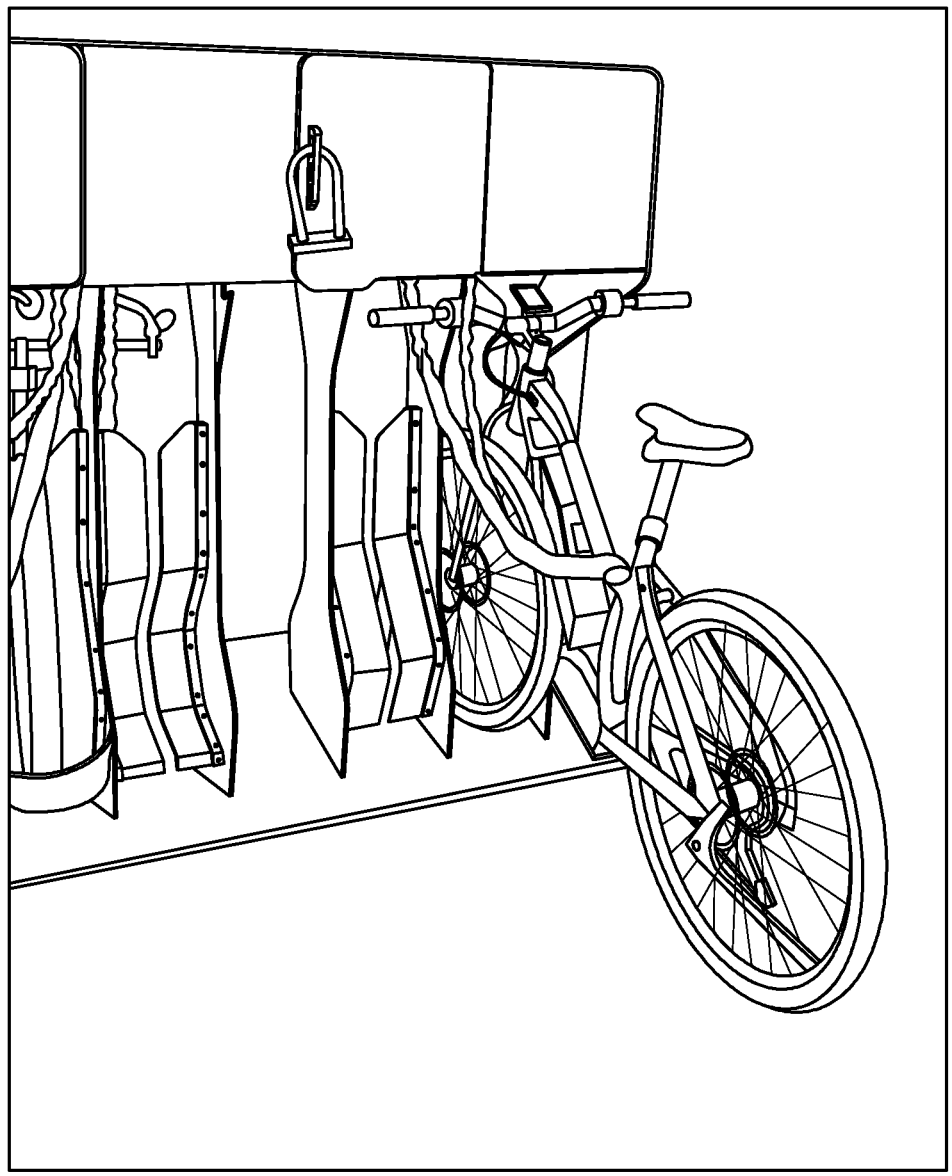
FIG. 30 shows an e-bike parked in a slot of the bike storage unit, with the locking chain and recharging smart cable both feeding through a slot in the bottom of the locker, in accordance with embodiments of the present invention.

FIG. 30 shows the bicycle storage device 60 shown in FIG. 29 with the securable locker door closed and locked, with the bike chain 800 and smart charger cable 1400 fed from inside the secured locker unit, to the parked bicycle external to the secured locker.

Figure 31:
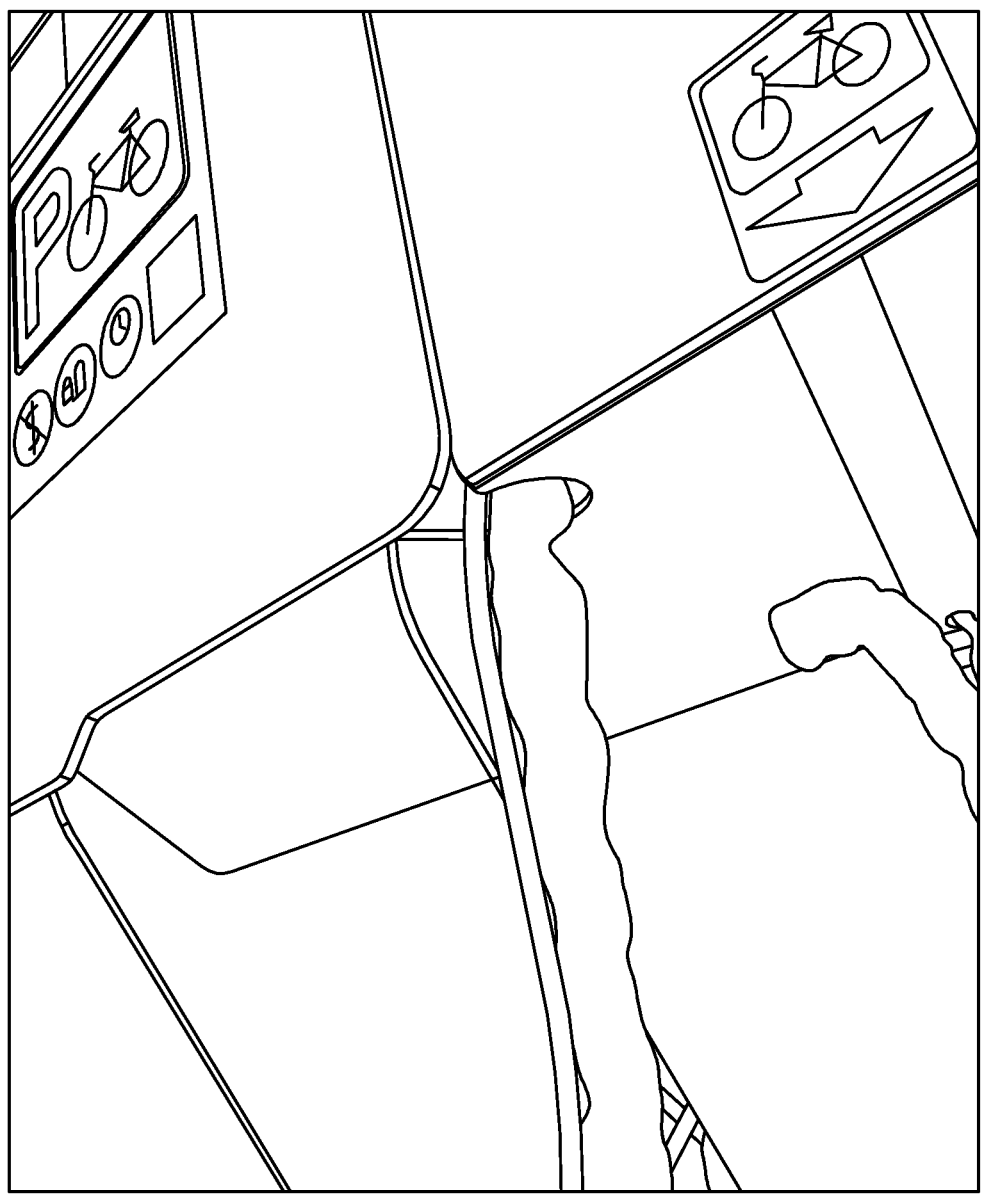
FIG. 31 is another view showing the locking chain and recharging smart cable both feeding through the slot in the bottom of the locker.

FIG. 31 shows the end of the chain 800 with covering passing back through the secured locker bottom plate through the opening in the bottom plate, to finally be secured inside the securable locker. The smart charger cable 1400 is also passed through the same opening in the bottom plate. Once the locker door is closed and a cyclist's lock is applied on to the multi-hole bracket, not only are the personal items within the internal cavity of the secured locker secured, and both ends of the bike lock chain 800, but also the smart battery charger unit 910 and the first end 1402 of the smart charger cable 1400 are also secured within the securable storage compartment 80.

Figure 32:
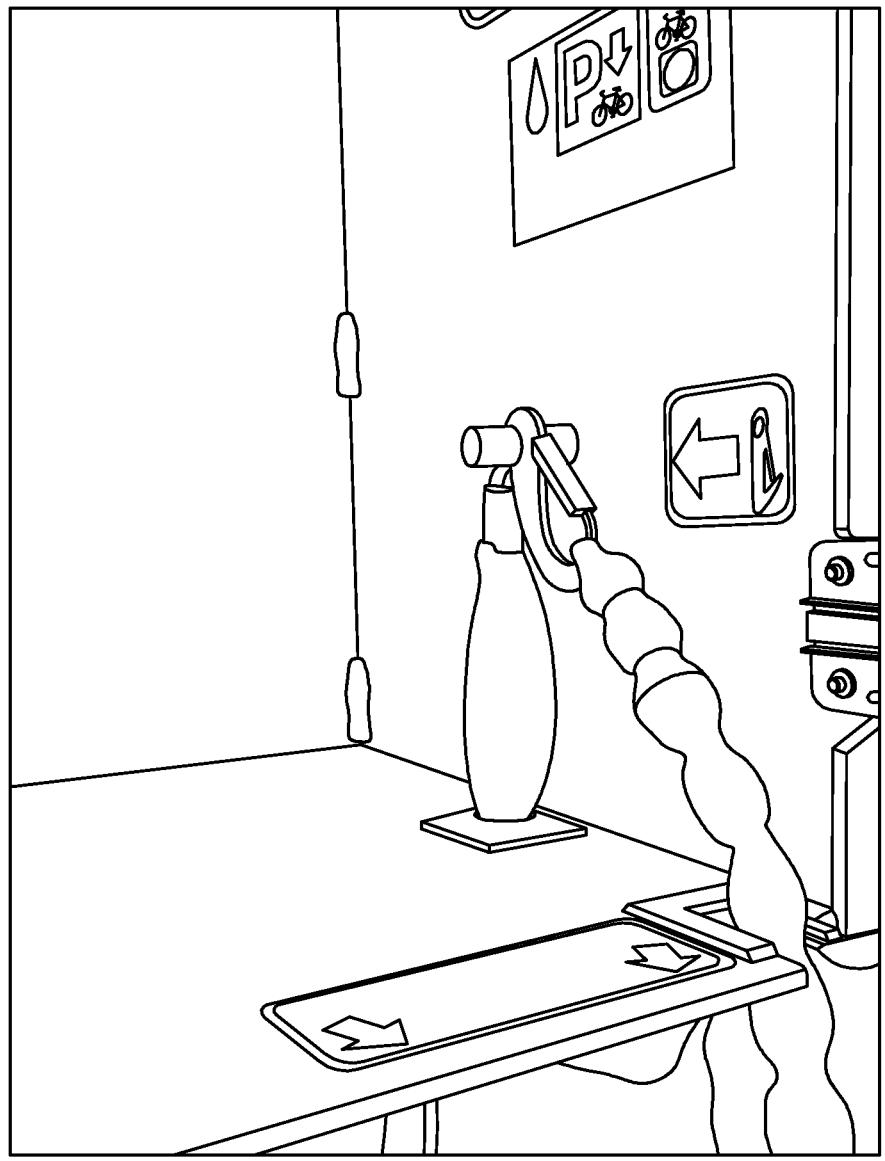
FIG. 32 shows more detail of both ends of an exemplary locking chain secured within the storage locker, in accordance with embodiments of the present invention.

FIG. 32 shows the chain 800 with covering passing through the locker bottom plate by an opening with one end secured into a carabiner 810 fixed to the locker inside wall. The other end of the chain 800 passes through another opening and is also fixed to the locker inside wall.

Figure 33:
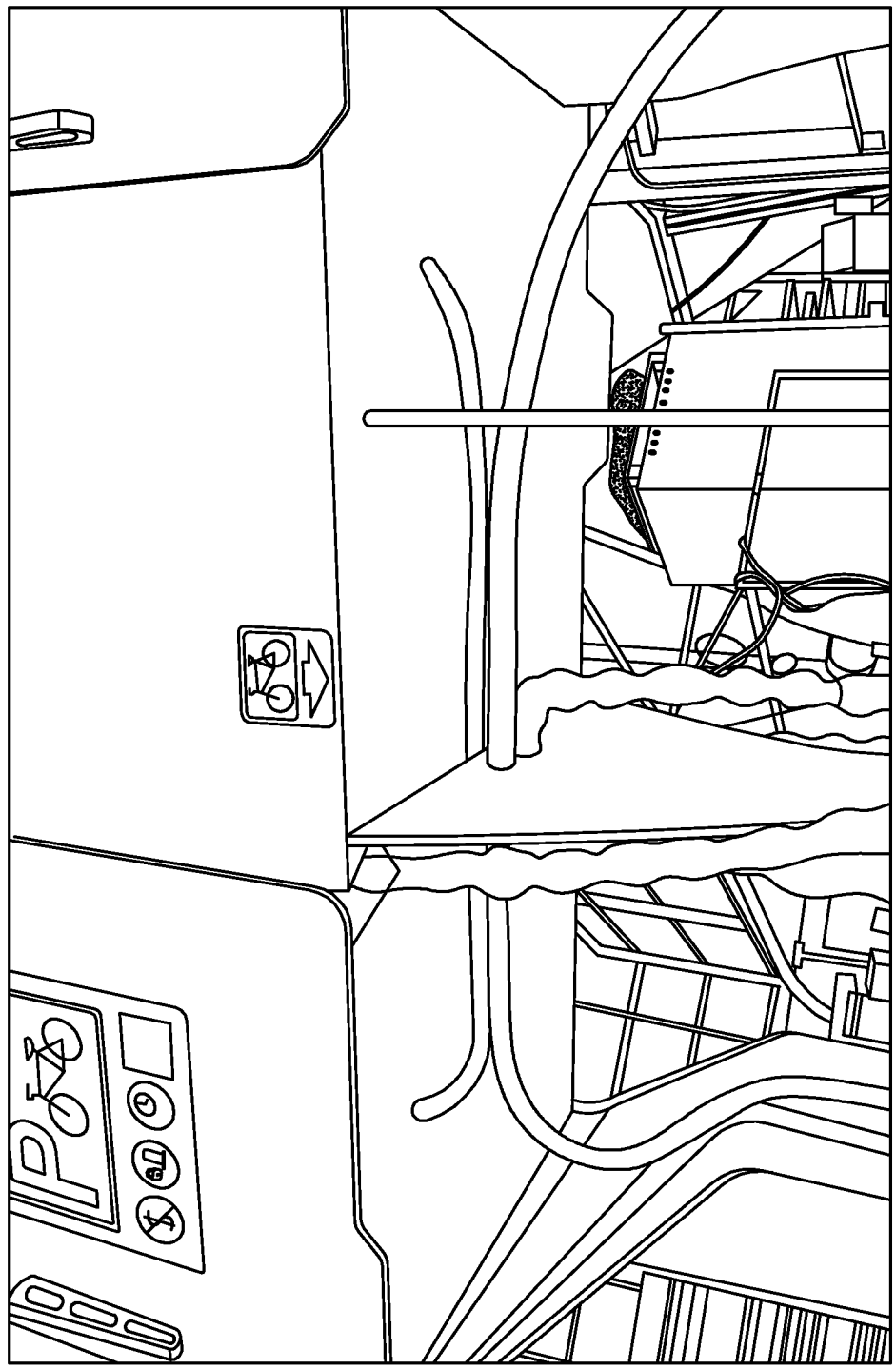
FIG. 33 shows an exemplary routing of a power cable to power the charging unit from service power, in accordance with embodiments of the present invention.

FIG. 33 shows exemplary routing of the electrical power cable between the local power grid and the power supplies to the smart battery charger units 910. In the disclosed embodiment, the electrical power cable follows the contours of the supporting structure of the bicycle storage device 60, through the locker bottom plate by an opening for connecting to the power supply.

While the invention has been described with reference to the exemplary embodiments thereof, those skilled in the art will be able to make various modifications to the described embodiments of the invention without departing from the true spirit and scope of the invention.

What is claimed is:

1. A bicycle stand, comprising:
   a frame defining a plurality of bike receiving recesses;
   a plurality of lockable containers, each of the plurality of lockable containers having an access door and being sized to receive at least a bicycle helmet;
   an externally lockable latch on the access door of each of the plurality of lockable containers, the lockable latch securing the access door in a closed secured state to create a secured interior of a respective one of the plurality of lockable containers;
   at least one battery charger unit mounted adjacent or within at least one of the plurality of lockable containers;
   a charge plug of a battery charger unit being mounted within the interior of each of the plurality of lockable containers; and
   a plurality of flexible cables each associated respectively with one of the plurality of lockable containers, both ends of each of the plurality of flexible cables breach into the secured interior of the lockable container through a bottom wall with the access door in the closed secured state while a central portion of the flexible cable is external to the respective one of the plurality of lockable containers;
   wherein both ends of the flexible cable are held entirely within the secured interior of the respective one of the plurality of lockable containers with the access door in the closed secured state;
   wherein a first passageway in the bottom wall is formed against the access door so as to permit passage of a charger cable when plugged between the charge plug inside the secured interior of the respective one of the plurality of lockable containers, and an electric bike parked in the bicycle stand.

2. The bicycle stand according to claim 1 wherein:
each of the plurality of lockable containers utilizes a key lock.

3. The bicycle stand according to claim 2 wherein:
each of the plurality of flexible cables associated respectively with one of the plurality of lockable containers is substantially cut resistant.

4. The bicycle stand according to claim 1, further comprising:
a hook member formed on an exterior of each of the plurality of lockable containers.

5. The bicycle stand according to claim 1, further comprising:
a second passageway in the bottom wall of the plurality of lockable containers;
wherein the first passageways in the bottom wall is formed between a right side wall and the bottom wall of the respective one of the plurality of lockable containers.

6. A bicycle stand, comprising:
a frame defining a plurality of bike receiving recesses;
a plurality of lockable containers, each of the plurality of lockable containers having an access door and being sized to receive at least a rechargeable battery of an electric bicycle (e-bike);
an externally lockable latch on the access door of each of the plurality of lockable containers, the lockable latch securing the access door in a closed secured state to create a secured interior of a respective one of the plurality of lockable containers;
at least one battery charger unit mounted adjacent or within each of the plurality of lockable containers;
a charge plug of a battery charger unit being mounted within the interior of each of the plurality of lockable containers; and
a plurality of flexible cables each associated respectively with one of the plurality of lockable containers, both ends of each of the plurality of flexible cables breach into the secured interior of the lockable container through a bottom wall with the access door in the closed secured state while a central portion of the flexible cable is external to the respective one of the plurality of lockable containers;
wherein both ends of the flexible cable are held entirely within the secured interior of the respective one of the plurality of lockable containers with the access door in the closed secured state.

* * * * *